US009825929B2

(12) United States Patent
Zhang

(10) Patent No.: US 9,825,929 B2
(45) Date of Patent: Nov. 21, 2017

(54) SYSTEMS AND METHODS FOR IMPORTING RELATION CHAIN AND PROVIDING CONTACT INFORMATION

(71) Applicant: Tencent Technology (Shenzhen) Company Limited, Shenzhen, Guangdong (CN)

(72) Inventor: Xiaolong Zhang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/602,026

(22) Filed: Jan. 21, 2015

(65) Prior Publication Data

US 2015/0237029 A1  Aug. 20, 2015

Related U.S. Application Data

(63) Continuation of application No. PCT/CN2014/080825, filed on Jun. 26, 2014.

(30) Foreign Application Priority Data

Sep. 30, 2013 (CN) .......................... 2013 1 0466057

(51) Int. Cl.
*H04L 29/06* (2006.01)
*H04L 29/08* (2006.01)

(52) U.S. Cl.
CPC ............ *H04L 63/08* (2013.01); *H04L 65/403* (2013.01); *H04L 67/10* (2013.01)

(58) Field of Classification Search
CPC ........ H04L 63/08; H04L 67/10; H04L 65/403
(Continued)

(56) References Cited

U.S. PATENT DOCUMENTS 8,244,851 B1 * 8/2012 Postoaca ................ G06Q 50/01
709/205
2007/0245245 A1 * 10/2007 Blue ................. G06F 17/30864
715/739

(Continued)

FOREIGN PATENT DOCUMENTS

CN  102710755 A  10/2012
CN  102710755 A  10/2012

(Continued)

OTHER PUBLICATIONS

Carlos "How to painlessly import contacts in Facebook, Twitter, LinkedIn and other social sites" available at least as early as Sep. 2, 2011 via https://web.archive.org/web/20110902035211/http://antezeta.com/news/import-contacts-in-facebook-twitter-linkedin, accessed Mar. 30, 2017.*

(Continued)

*Primary Examiner* — Matthew Henning
(74) *Attorney, Agent, or Firm* — Brinks Gilson & Lione

(57) ABSTRACT

A computer system, serves as a first platform, provides a user with a first user account on the first platform. The user has a second user account on a second platform; the second user account includes a second contact identification associated with a contact of the user on the second platform; and the contact has a first contact account on the first platform associated with a first contact identification. The computer system also acquires the second contact identification from the second platform; acquires account information of the first contact account based on the second contact identification; and provides the account information of the first contact account to the user.

14 Claims, 16 Drawing Sheets

(58) Field of Classification Search
USPC .............................................................. 726/6
See application file for complete search history.

(56) References Cited

U.S. PATENT DOCUMENTS

| | | | |
|---|---|---|---|
| 2009/0319288 A1* | 12/2009 | Slaney | G06Q 30/02 705/1.1 |
| 2010/0274815 A1* | 10/2010 | Vanasco | G06F 17/30867 707/798 |
| 2010/0281113 A1* | 11/2010 | Laine | G06Q 10/10 709/204 |
| 2011/0106857 A1* | 5/2011 | Besombe | G06Q 10/10 707/803 |
| 2012/0246004 A1* | 9/2012 | Book | G06Q 30/02 705/14.58 |
| 2013/0227018 A1 | 8/2013 | Regan et al. | |
| 2013/0293664 A1* | 11/2013 | Tsang | H04L 12/1827 348/14.03 |
| 2013/0311283 A1* | 11/2013 | Liu | G06F 17/30539 705/14.53 |
| 2014/0122585 A1* | 5/2014 | DeLong | H04W 4/003 709/204 |
| 2014/0280559 A1* | 9/2014 | Torgersrud | H04L 67/22 709/204 |

FOREIGN PATENT DOCUMENTS

| | | |
|---|---|---|
| CN | 102932414 A | 2/2013 |
| CN | 103281375 A | 9/2013 |

OTHER PUBLICATIONS

International Search Report dated Sep. 30, 2014 in International Application No. PCT/CN2014/080825.
First Office Action to Chinese Application No. 201310466057.6, dated Jul. 4, 2017 and English translation, (11p).

* cited by examiner

SYSTEMS AND METHODS FOR IMPORTING RELATION CHAIN AND PROVIDING CONTACT INFORMATION

PRIORITY STATEMENT

This application is a continuation of International Application No. PCT/CN2014/080825, filed on Jun. 26, 2014, in the State Intellectual Property Office of the People's Republic of China, which claims the priority benefit of Chinese Patent Application No. 201310466057.6 filed on Sep. 30, 2013, the disclosures of which are incorporated herein in their entirety by reference.

TECHNICAL FIELD

The present disclosure relates to Internet communications. Specifically, the present disclosure relates to systems and methods for importing relation chain from a third-party account of a user and providing account information to the user.

BACKGROUND

As the Internet technology develops, internet platforms for social network (i.e., social platforms) based on the internet have been widely used. Users can firstly register an account where a contact list is included on the social platform, and then communicate with contacts included in the contact list via some social applications.

Commonly, contacts of a user on the contact list are added by the user. For example, the user first obtains an account of a certain contact, and then enters the account of the contact to an application of social networking (social application) in her local terminal device (e.g., a smart phone) connecting to the social platform through the social application; then, the social application sends an adding request to the social platform, wherein the adding request carries the account of the user and the account of the contact; finally, the social platform adds the account of the contact to the contact list of the account of the user, thereby adding the contact to the contact list.

To this end, the user must first obtain an account of the contact so that the contact could be added to the contact list. But usually, a user finds it is not only time consuming but also impractical to manually obtain all contacts' accounts he/she historically connected with.

SUMMARY

According to an aspect of the present disclosure, a computer system may serves as a first platform to provide a user with a first user account on the first platform, wherein the user has a second user account on a second platform; the second user account includes a second contact identification associated with a contact of the user on the second platform; and the contact has a first contact account on the first platform associated with a first contact identification. The computer system may also acquire the second contact identification from the second platform; acquire account information of the first contact account based on the second contact identification; and provide the account information of the first contact account to the user.

According to another aspect of the present disclosure, a processor-implemented method for obtaining contact information from a third-party account of a user may comprise providing, by a processor of a first platform, a user with a first user account on the first platform, wherein the user has a second user account on a second platform, the second user account includes a second contact identification associated with a contact of the user on the second platform, and the contact has a first contact account on the first platform associated with a first contact identification. The method may further comprise acquiring, by the processor, the second contact identification from the second platform; acquiring, by the processor, account information of the first contact account based on the second contact identification; and providing, by the processor, the account information of the first contact account to the user.

According to yet another aspect of the present disclosure, a non-transitory, processor-readable storage medium may comprise a set of instructions for obtaining contact information from a third-party account of a user. The set of instructions, when executing by a processor of a first platform, may direct the processor to perform acts of providing a user with a first user account on the first platform, wherein the user has a second user account on a second platform, the second user account includes a second contact identification associated with a contact of the user on the second platform, and the contact has a first contact account on the first platform associated with a first contact identification. Further, the set of instructions may be configured to direct the processor to perform acts of acquiring the second contact identification from the second platform; acquiring account information of the first contact account based on the second contact identification; and providing the account information of the first contact account to the user.

BRIEF DESCRIPTION OF THE DRAWINGS

The above and other features and advantages will become more apparent by describing in detail example embodiments thereof with reference to the attached drawings in which.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 13:
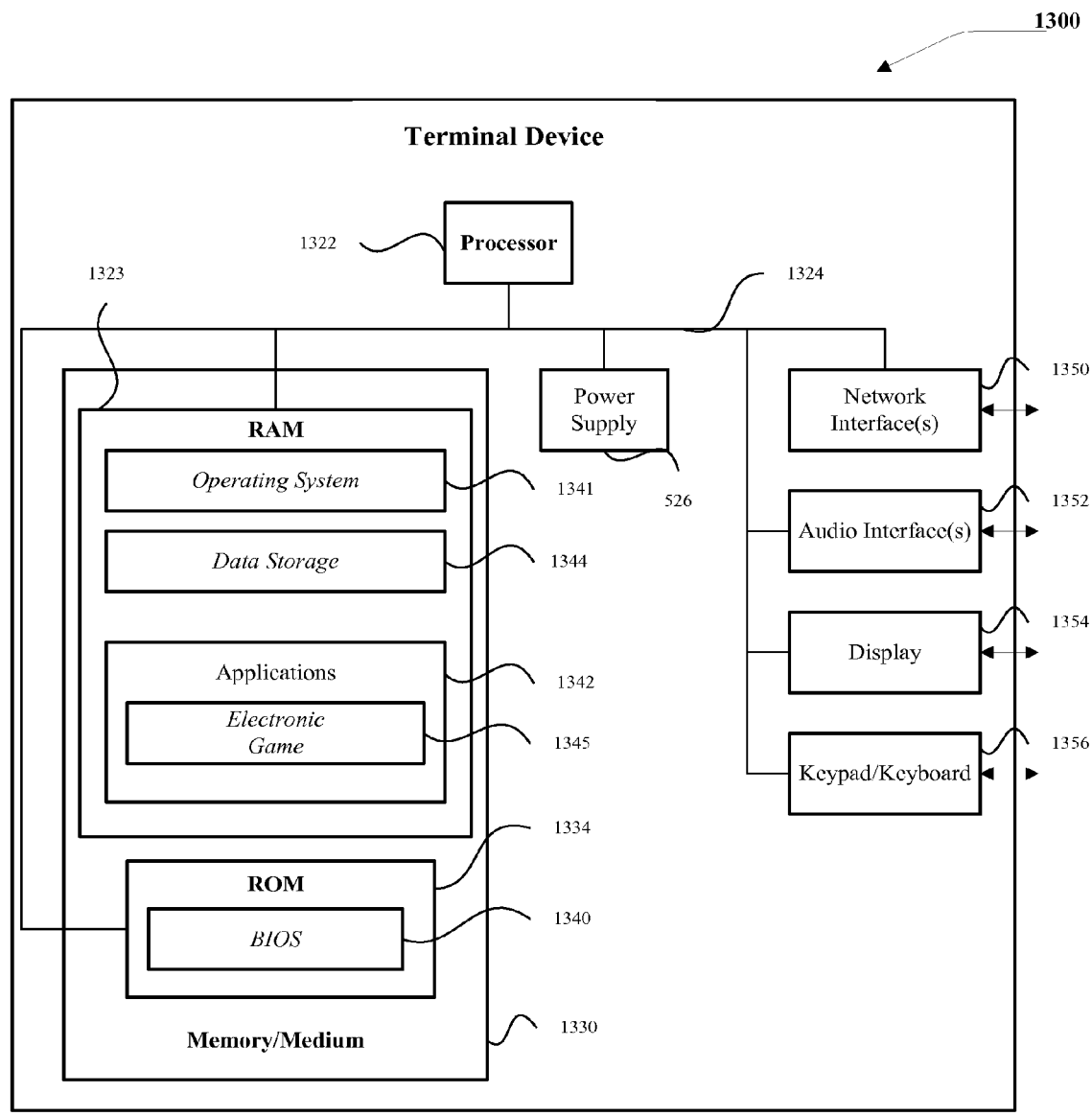
FIG. 13 is a schematic diagram illustrating an example embodiment of a client device.

FIG. 13 is a schematic diagram illustrating an example embodiment of a terminal device. The terminal device may be used by individual user as a terminal device of a social networking platform as introduced in the present disclosure. The terminal device may include apparatuses and applications to execute methods and software systems introduced in the present disclosure. A terminal device 1300 may be a computing device capable of executing a software system. The terminal device 1300 may, for example, be a device such as a personal desktop computer or a portable device, such as a laptop computer, a tablet computer, a cellular telephone, or a smart phone.

The terminal device 1300 may vary in terms of capabilities or features. Claimed subject matter is intended to cover a wide range of potential variations. For example, the terminal device 1300 may include a keypad/keyboard 1356. It may also include a display 1354, such as a liquid crystal display (LCD), or a display with a high degree of functionality, such as a touch-sensitive color 2D or 3D display. In contrast, however, as another example, a web-enabled terminal device 1300 may include one or more physical or virtual keyboards, and mass storage medium 1330.

The terminal device 1300 may also include or execute a variety of operating systems 1341, including an operating system, such as a Windows™ or Linux™, or a mobile operating system, such as iOS™, Android™, or Windows Mobile™. The terminal device 1300 may include or may execute a variety of possible applications 1342, such as an instant messenger 1345 (e.g., WeChat™ developed by Tencent). An application 1342 may enable communication with other devices via a network, such as communicating with another terminal device used by another person or a server via a network.

Further, the terminal device 1300 may include one or more non-transitory processor-readable storage media 1330 and one or more processors 1322 in communication with the non-transitory processor-readable storage media 1330. For example, the non-transitory processor-readable storage media 1330 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 1330 may store sets of instructions, or units and/or modules that may include the sets of instructions, for conducting operations and/or method steps described in the present disclosure. Alternatively, the units and/or modules may be hardware disposed in the terminal device 1300 configured to conduct operations and/or method steps described in the present disclosure. The one or more processors may be configured to execute the sets of instructions and perform the operations in example embodiments of the present disclosure.

Figure 14:
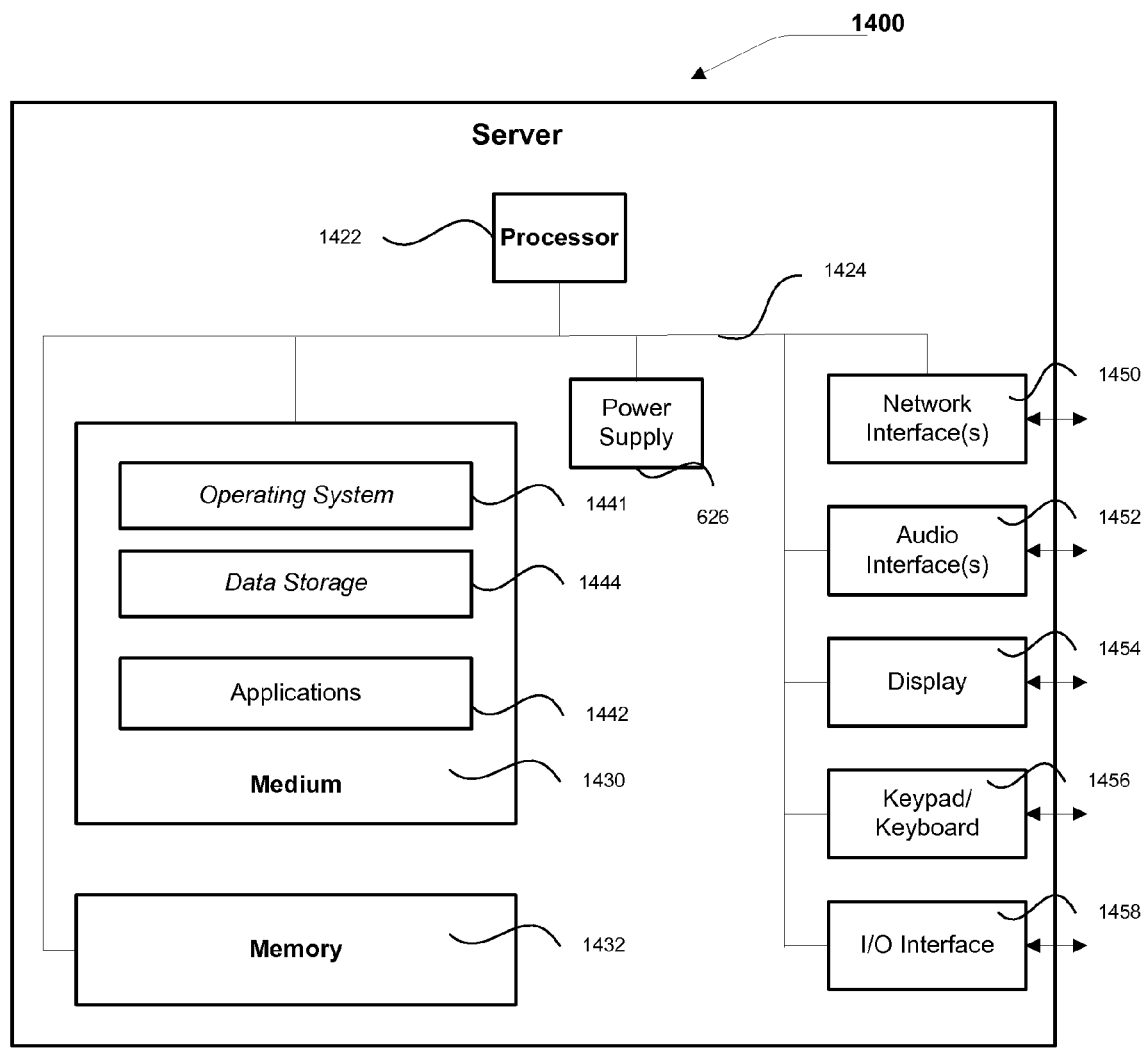
FIG. 14 is a schematic diagram illustrating an example embodiment of a terminal device.

FIG. 14 is a schematic diagram illustrating an example embodiment of a server. The server 1400 may provide support for the social networking platform as described in the present disclosure and may connect to the terminal device 1300 locally or via a network. A Server 1400 may vary widely in configuration or capabilities, but it may include at least one central processing unit, e.g., processor 1422, and memory 1432, at least one medium 1430 (such as one or more mass storage devices) storing application programs 1442 or data 1444 for the communication platform, one or more power supplies 1426, one or more wired or wireless network interfaces 1450, one or more input/output interfaces 1458, and/or one or more operating systems 1441, such as Windows Server™, Mac OS X™, Unix™, Linux™, FreeBSD™, or the like. Thus a server 1400 may include, as examples, dedicated rack-mounted servers, desktop computers, laptop computers, set top boxes, mobile computational devices such as smart phones, integrated devices combining various features, such as two or more features of the foregoing devices, or the like.

The server 1400 may serve as a search server or a content server. A content server may include a device that may include a configuration to provide content via a network to another device. A content server may, for example, host a site, such as a social networking site, examples of which may include, but are not limited to, Flicker™, Twitter™, Facebook™, LinkedIn™, or a personal user site (such as a blog, vlog, online dating site, etc.). A content server may also host a variety of other sites, including, but not limited to business sites, educational sites, dictionary sites, encyclopedia sites, wikis, financial sites, government sites, etc. A content server may further provide a variety of services that may include, but are not limited to, web services, third party services, audio services, video services, E-mail services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server may include desktop computers, multiprocessor systems, microprocessor type or programmable consumer electronics, etc.

Merely for illustration, only one processor will be described in terminal devices and servers that execute operations and/or method steps in the following example embodiments. However, it should be note that the terminal devices and servers in the present disclosure may also include multiple processors, thus operations and/or method steps that are performed by one processor as described in the present disclosure may also be jointly or separately performed by the multiple processors. For example, if in the present disclosure a processor of a terminal device and/or a server executes both step A and step B, it should be understood that step A and step B may also be performed by two different processors jointly or separately in the terminal device (e.g., the first processor executes step A and the second processor executes step B, or the first and second processors jointly execute steps A and B).

The following methods may be implemented in the server 1400 for operations executed on a social networking platform ("the first platform") and in the terminal device 1300 for operations executed on a terminal side. According to example embodiments, a user who uses the terminal device 1300 may register a first account ("the first user account") on the first platform, using a first user identification. For example, the first platform may be an online social medium, such as www.wechat.com, that provides a platform for registered users to chat online with friends and tweet. A user may install an application, WeChat, in the terminal device 1300 in order to use the online social medium, and may register an account in www.wechat.com. To register, the user may use his/her cell phone number as the first user identification and register the account. Alternatively, the user may also use other information, such as an email address, as his/her user identification. Additionally, the user may also have registered another account ("the second user account", such as an email account), in another social networking platform ("the second platform," such as an E-mail provider), using his/her second user identification (e.g., cell phone number) or third user identification (e.g., email account). For example, the user may register a Gmail account using his/her cell phone number or an email account number. The user may save a list of contacts ("the contact list") in his/her second user account. A contact of the user in the contact list may have an account ("the second contact account") on the second platform. Similar to the user, the contact may register the second contact account using a second identification ("the second contact identification") and/or a third identification ("the third contact identification"), such as the contact's cell phone number or email account number. Additionally, the contact may also register an account ("the first contact account") on the first platform using his/her first identification ("the first contact identification"). In the below introduction, the contact may be a single person, or may be a multiple contacts of the user.

Merely for illustration purpose, in the following methods the terminal device is in communication with the first platform and operations initiated by the application (e.g., WeChat) of the terminal device to the second user account and/or the second platform are performed through the first platform. For example, when the terminal device sends a request to the second user account and/or the second platform, the terminal device may send the request through the first platform. However, it should be noted that the terminal device may directly perform an operation to the second user account and/or the second platform without participation of the first platform. For example, the terminal device may directly send a request to the second user account and/or the second platform.

Figure 1:
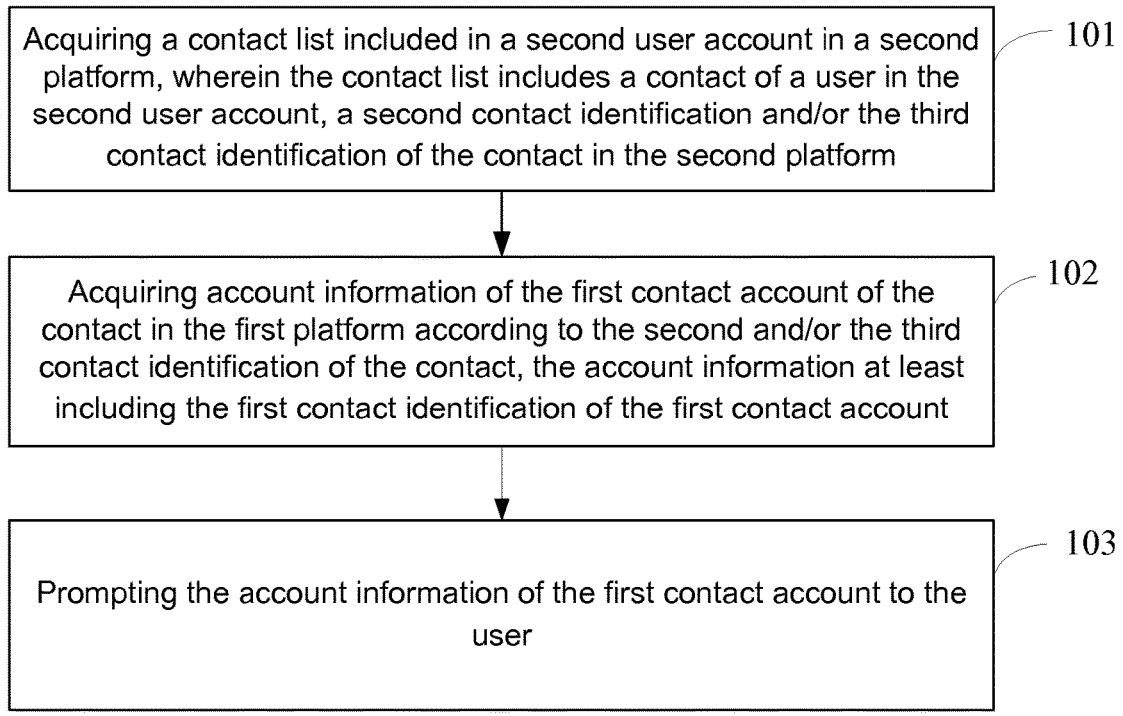
FIG. 1 is a flowchart of a method for providing account information according to a first example embodiment of the present disclosure.

FIG. 1 is a flowchart of a method for providing account information according to a first example embodiment of the present disclosure. The method may include the following steps:

Step 101, acquiring a contact list included in a second user account in a second platform, wherein the contact list includes a contact of a user in the second user account, a second contact identification and/or the third contact identification of the contact on the second platform.

For example, a user Harry may have a WeChat account using his Gmail account as the first user identification. With Harry's permission, the web platform of WeChat, www-.wechat.com, may acquire access to Harry's Gmail account, which Harry registered using his cellphone number as the second user identification. Harry's Gmail account includes a contact list, wherein Alyssa is one of the contacts. Alyssa has a Gmail account as well. Harry's contact list in his Gmail account includes Alyssa's cell phone number, which Alyssa uses as her second user identification associated with her Gmail account.

Step 102, acquiring account information of the first contact account of the contact in the first platform according to the second and/or the third contact identification of the contact, the account information at least including the first contact identification of the first contact account.

In this step, if the contact list includes the third contact identification of the contact, the first platform may search a relationship between the third contact identification and the first contact identification stored in the first platform according to the third contact identification of the contact in the contact list. If the first platform finds the first contact identification corresponding to the third contact identification, the first platform may acquire the account information of the first contact account that corresponds to the first contact identification.

If the contact list includes the second contact identification of the contact, the first platform may also search a relationship between the second contact identification and the first contact identification stored in the first platform according to the second contact identification of the contact included in the contact list. If the first platform finds the first contact identification corresponding to the second contact identification, the first platform may acquire the account information of the first contact account that corresponds to the first contact identification.

For example, www.wechat.com may take Alyssa's cell phone number associated with her Gmail account to search whether Alyssa has a first contact identification registered in www.wechat.com, i.e., whether Alyssa's cell phone number is associated with her WeChat account. If Alyssa did registered a WeChat account using her cell phone number, www.wechat.com may obtain Alyssa's WeChat account.

Step 103, prompting the account information of the first contact account to the user.

In this step, the first platform may prompt and/or display the user in the first platform with the account information of the first contact account of the contact.

In this example embodiment, the first platform may obtain the contact list included in the second user account from a second platform, wherein the contact list may include a contact of the user in the second user account. The first platform may also obtain a second contact identification corresponding to the contact, and/or a third contact identification of the second contact account. Thus the first platform may obtain account information of the first contact account in the first platform according to the second or the third contact identification, and the account information at least includes the first contact identification of the first contact account. Accordingly, the user may be able to add her contact in the second account of the second platform to her contact list in the first account of the first platform, thereby her online connections in the first account.

FIG. 2A to FIG. 2E illustrate another example embodiment of a method for providing account information. The example embodiment may provide a contact's first contact account information to the user, so that the user may add the contact identification of the first contact account to the contact list ("the first user account contact list") of the user in the first account.

Procedure of the method may include three processes as follows. First, the first platform may request an authorization of the second platform; second, the first platform may bind the third user identification of the second user account to the first user identification of the first account; third, the first platform may acquire the second or the third contact identification of a contact included in the second user account, and use the second or third contact identification to obtain the first contact identification of the contact.

Figure 2A:
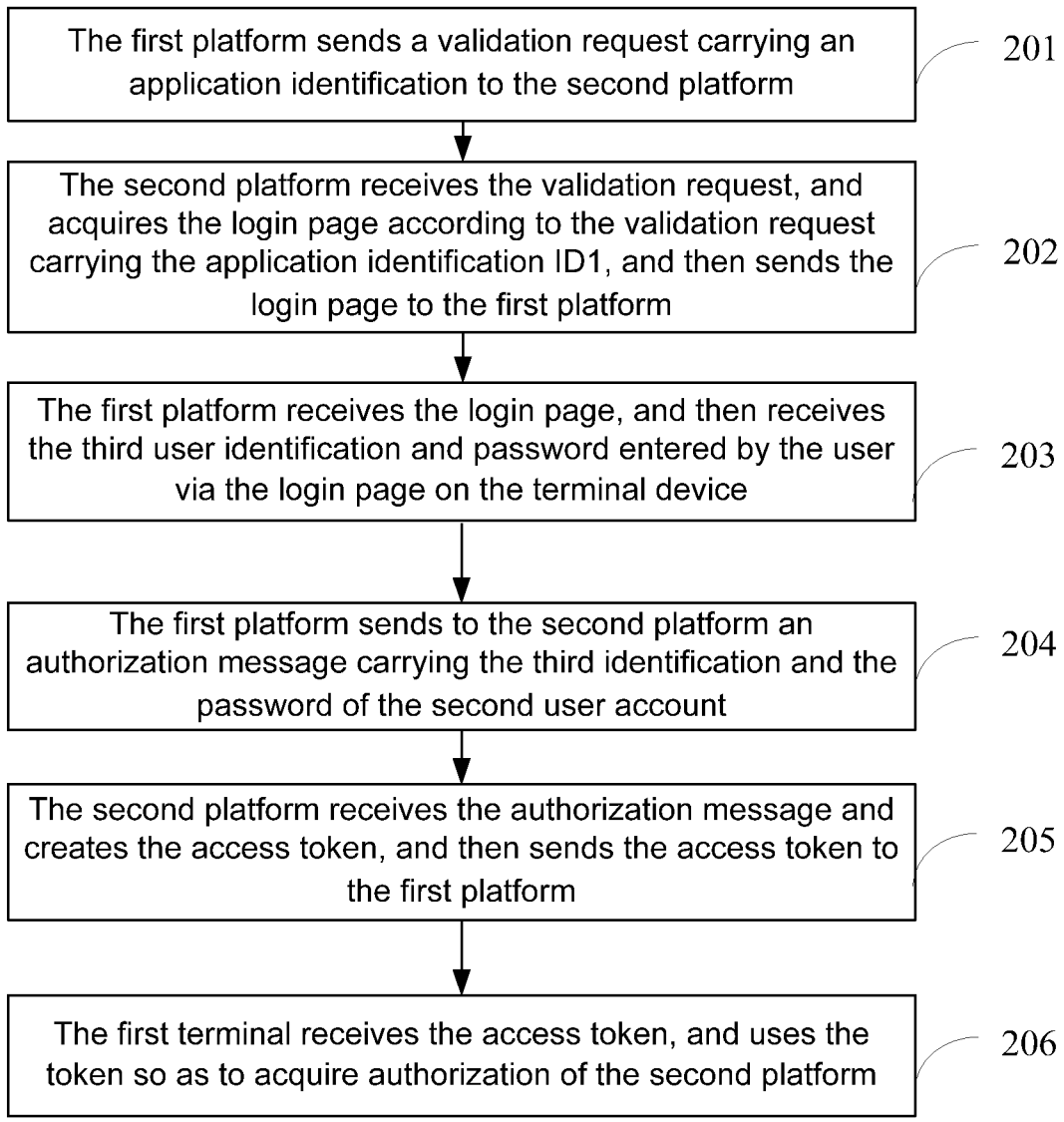
FIG. 2A is a flowchart of a method for providing account information according to a second example embodiment of the present disclosure.

FIG. 2A is a flowchart of the method for providing account information according to a second example embodiment of the present disclosure. The method may include the following steps:

Step 201, the terminal device may send a validation request carrying an application identification to the second platform through the first platform. The validation request is configured to validate from the second platform an authority that the first platform is authorized to access the first user account on the second platform.

To this end, the first platform may register an account ("the first platform account") on the second platform beforehand. During registration, the second platform may generate the application identification for the first platform. The first platform may store the application identification in the terminal device in advance, so that when the user authorizes the first platform to acquire his/her second user account, the first platform may log into the first platform account through the application identification. Further, the first platform account is properly configured, so that the first platform may be able to acquire a user's information on the second platform upon proper authorization from the user.

For example, when WeChat is running by the terminal device (e.g., terminal device 1300) of Harry, WeChat may connect the terminal device to the first platform, www.wechat.com, which is the service provider of the WeChat. The first platform www.wechat.com may ask permission from Harry to access the contact list in his Gmail account, which is the second platform. After receiving Harry's authorization, the first platform, www.wechat.com, may send the application identification to the server of the second platform, www.google.com, targeting to the corresponding Gmail account of Harry.

After generating the application identification, the second platform may further generate a login page, and then the generated application identification and the login page may be associated with each other and may be stored in the corresponding relation of the application identification and the login page.

The third user identification of the second user account may be an E-mail address or phone number, etc. . . . . The first user identification of the first user account may be the account number of the user account registered in the first platform, or the account number of the social application account registered in the first platform.

As stated in the above example, an E-mail service platform, such as Google.com for Gmail, may be the second platform, and an application server of the social application, such as www.wechat.com for WeChat, may be the first platform. Accordingly, the Gmail account of Harry may be the second user account, the Gmail address may be the third identification of the second account, the application account that Harry registers in the WeChat application server may be the first user account, and the application account number of his WeChat account, or his cell phone number associated with the WeChat account may be the first user identification. Same relationship may be applied to Alyssa, Harry's Gmail contact, as well. However, it should be note that the second and first platforms in the present disclosure are not limited to E-mail service platforms and social networking platform, respectively. Any online platforms that may adopt the method in the present disclosure may be used.

Figure 2B:
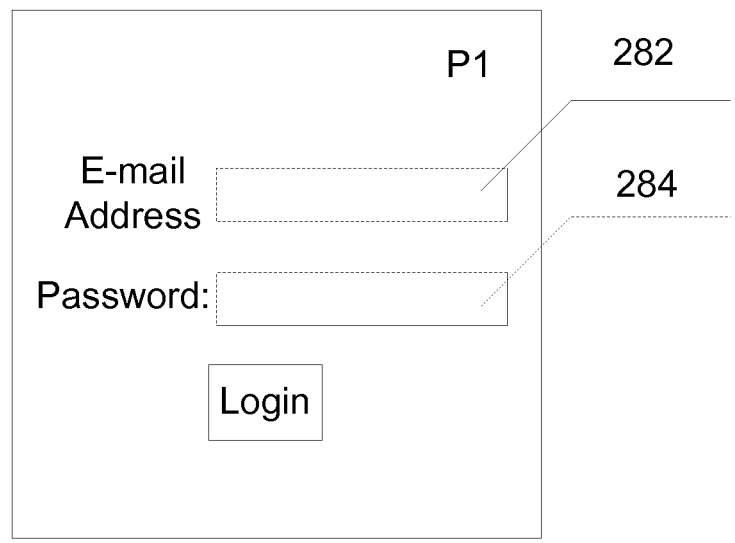
FIG. 2B is a first schematic view of a login page according to the second example embodiment of the present disclosure.

FIG. 2B is a schematic view of a login page P1 and application identification ID1 generated by the second platform when the second platform is an E-mail service platform, according to the second example embodiment of the present disclosure. The login page P1 may include an E-mail address input box 282 and a password input box 284, and the application identification ID1 and the login page P1 may be stored in the corresponding relation between the application identification and the login page as shown in table 1.

TABLE 1

| application identification | login page |
|---|---|
| ID1 | login page P1 |
| ... | ... |

When the user inputs his/her E-mail address and password of the second user account, the terminal may send a validation request carrying the application identification ID1 to the E-mail service platform.

Step 202, the second platform may receive the validation request, and acquires the login page according to the validation request carrying the application identification ID1, and then may send the login page to the first platform (and the terminal).

In this step, after receiving the validation request, the second platform acquires the login page corresponding to the second user account from the stored corresponding relation between the application identification and the login page, and then may send the login page to the terminal.

For example, the E-mail service platform may receive the validation request carrying the application identification ID1, and acquires the login page P1 corresponding to the second user account from the stored corresponding relation between the application identification and the login page shown in table 1, and then may send the login page P1 to the terminal device, and then the user can log into the E-mail service platform.

Step 203, the first platform may receive the login page, and then may receive the third user identification (e.g., Harry's Gmail address) and password entered by the user via the login page.

In this step, the terminal may receive and display the login page to the user. The login page may include a third identification input box and password input box, where the user may enter the third identification and the password. The terminal and the first platform then may read the third identification and the password.

Figure 2C:
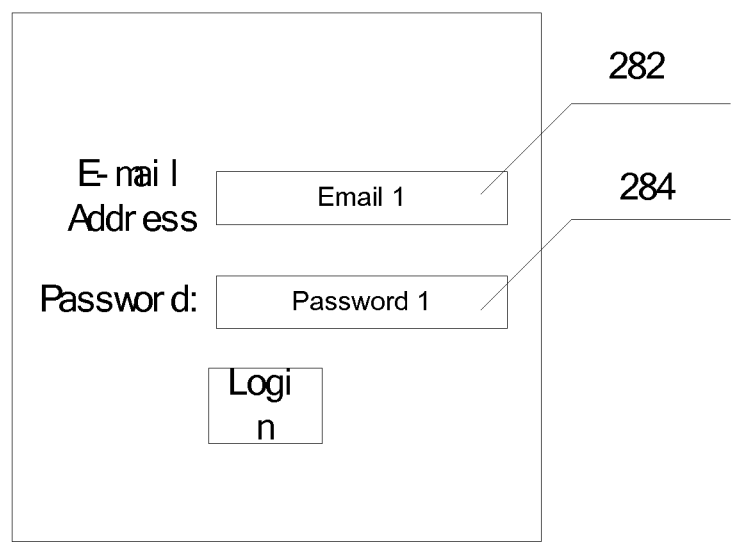
FIG. 2C is a first schematic view of a login page according to the second example embodiment of the present disclosure.

FIG. 2C is a schematic view of a login page according to the second example embodiment of the present disclosure. In FIG. 2C, the user enters the E-mail address Email1 and the password Password1 in the third identification input box and password input box respectively, and then the E-mail address Email1 and the password Password1 will be read by the terminal, which will subsequently will Email1 and Password1 to the first platform.

Step 204, the first platform may send an authorization message carrying the third identification and the password of the second account of the user to the second platform.

For example, the terminal may send an authorization message carrying the E-mail address Email1 and the password Password1 of the E-mail account to the E-mail service platform.

Step 205, the second platform may receive the authorization message carrying the third identification and the password of the second account of the user and creates the access token, and then may send the access token to the terminal through the first platform.

In this step, the second platform may receive the authorization message carrying the third identification of the second account, then may obtain a corresponding password from the stored corresponding relation of the third identification and the password, and then compare the stored password with the password carried in the authorization message. If the two passwords matches with each other (e.g., the stored password is the same as the received password), the second platform may create the access token and finally send it to the terminal; If the two passwords does not match, the second platform may terminal the operation. In this step, the access token may be used for identifying the third identification of the second account (under the example that the user inputs an E-mail address from the terminal device side).

Further, the second platform may store the third user identification and the corresponding access token in a corresponding relationship between the third identification and the access token.

For example, the user may register the second user account on the second platform in advance, using the third user identification and the password, and the second platform may store the third user identification and the password in a corresponding relationship.

In this step, the second account of the user may further include a second contact identification of the contact of the user, and/or the third contact identification of the contact in the second account.

For example, the user Harry may register his E-mail address Email1 and password Password1 in the E-mail service platform (e.g., www.google.com) in advance, and the E-mail service platform stores them in a corresponding relationship shown in Table 2.

TABLE 2

| mail address | password |
| --- | --- |
| Email1 | Password1 |
| ... | ... |

To this end, the E-mail service platform may first receive the authorization message sent by the terminal device, then may obtain the corresponding password Password1 from the stored corresponding relationship shown in Table 2 based on the received E-mail address carried in the authorization message, and then compare the stored password with the received password carried in the authorization message. If the two passwords are the same, the E-mail service platform may generate an access token A according to the E-mail address Email1 and finally send it to the terminal device, meanwhile, the E-mail address Email1 of the user and the access token A may be stored in the relationship between the E-mail address and the access token as shown in Table 3.

TABLE 3

| Mail address | Access token |
| --- | --- |
| Email1 | A |
| ... | ... |

Step 206, the first platform may receive the access token, and uses the token so as to acquire authorization of the second platform.

Figure 2D:
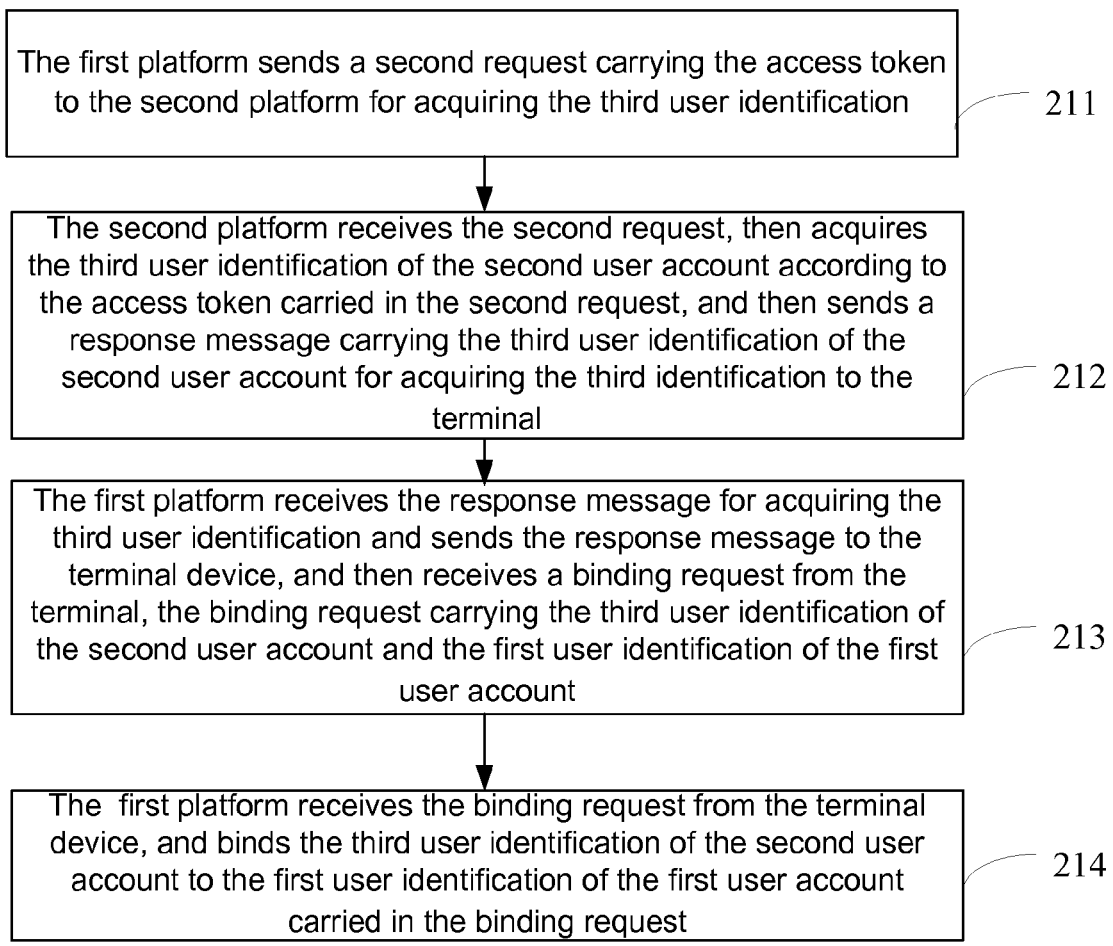
FIG. 2D is a flowchart of a method for providing account information according to the second example embodiment of the present disclosure.

FIG. 2D is a flowchart of a method for providing account information according to the second example embodiment of the present disclosure. The process of binding the third user identification of the second user account to the first user identification of the first user account may be accomplished by steps 211 to 214 as follow.

Step 211, the first platform may send a second request carrying the access token to the second platform for acquiring the third user identification.

For example, the terminal may, through the first platform, receive the access token A, and send a second request carrying the access token A to the E-mail service platform (i.e., the second platform) through the first platform so as to acquire the E-mail address.

Step 212, the second platform may receive the second request, then acquires the third user identification of the second user account according to the access token carried in the second request, and then may send a response message carrying the third user identification of the second user account for acquiring the third identification to the terminal.

In this step, the second platform may first receive the second request, and then acquire the third user identification of the second user account from the stored relationship between the third user identification and the access token, according to the access token carried in the second request; or the second platform may acquire the third user identification of the second user account by an inverse operation to the access token carried in the second request. And then, the second platform may send the response message carrying the third user identification of the second account to the first platform.

For example, the E-mail service platform may receive the second request, then may acquire the E-mail address of Harry's E-mail account (e.g., Gmail) from the stored relationship between the E-mail address Email1 and the access token shown in Table 3, according to the access token A carried in the second request; or the E-mail service platform may acquire the E-mail address Email1 by an inverse operation to the access token A carried in the second request, and then send the response message carrying the E-mail address Email1 of the E-mail account to the terminal.

Step 213, the first platform may receive the response message for acquiring the third user identification and may send the response message to the terminal device, and then may receive a binding request from the terminal, the binding request carrying the third user identification of the second user account and the first user identification of the first user account.

Further, the binding request may also carry the second user identification.

In this step, the second user identification may be an identification obtained from local and may be an identification other than the first and third user identification, the second user identification may identify the second user account of the user.

For example, the terminal may receive the E-mail address Email1 of the user, and send the binding request to the first platform. The binding request may carry the E-mail address Email1 and an application identification IM1 of the application account.

Further, the binding request may also carry a second user identification Phone1 of the user, and the second user identification may be the phone number, instant messaging account or E-mail address of the user.

Step 214, the first platform may receive the binding request from the terminal device, and binds the third user identification of the second user account to the first user identification of the first user account carried in the binding request.

In this step, the first platform may receive the binding request, and store the third user identification of the second user account and the first user identification of the first user account carried in the binding request in a relationship of the third user identification and the first user identification, so as to bind them together.

In some implementations, the process of storing the third user identification of the second user account and the first user identification of the first user account carried in the binding request in a relationship of the third user identification and the first user identification includes:

The first platform may search the relationship between the third user identification (or the second user identification) and another user identification according to the third user identification of the second user account carried in the binding request; if the first platform finds another user identification other than the first user identification, the first platform may determine that the third user identification of the second user account has been bound with a user identification other than the first user identification. Accordingly, the first platform may prompt the user if he/she wishes to continue or stop the current binding process. If the user chose to continue the binding process, the first platform may delete the existing binding relationship between the third user identification and the other user identification, and store the third user identification and the first user identification carried in the binding request in the relationship of the third user identification and the first user identification (i.e., bind the third user identification with the first user identification). If the user chose not to continue the binding process, the first user identification may stop processing the binding request. If the first platform does not find a user identification being bound to the third user identification, the first platform may in turn search the stored relationship of the third and the first user identifications according to the first user identification carried in the binding request. If a user identification other than the third user identification is found, the first platform may determine that the first user identification of the first user account has been bound with another user identification. Accordingly, the first platform may prompt the user if he/she wishes to continue or stop the current binding process. If the user chose to continue the binding process, the first platform may delete the existing binding relationship between the first user identification and the third user identification, the first platform may delete relationship of the first user identification and the other user identification searched out, and stores the third user identification of the second user account and the first user identification carried in the binding request in the relationship of the third and first user identifications. If no corresponding third user identification is searched out, the first platform may store the third user identification of the second user account and the first user identification of the first user account carried in the binding request in the relationship of the third and first user identifications.

In this step, for any one user in the first platform, it's the same procedure for binding a third user identification and a first user identification thereof as the steps 211 to 214 mentioned above.

For example, the application server (e.g., www.wechat.com) of the social application (e.g., WeChat) may receive the binding request, and stores the E-mail address Email1 of the E-mail account and the application account number IM1 of the application account carried in the binding request in a relationship of third and first user identifications as shown in Table 4, so as to bind the E-mail address Email1 and the application account number IM1 together.

TABLE 4

| Mail address | Application account number |
|---|---|
| Email1 | IM1 |
| Email2 | IM2 |
| Email3 | IM3 |
| Email4 | IM4 |
| . . . | . . . |

Further, according to the second user identification carried in the binding request, the first platform may store the second user identification and the first user identification of the first user account in a relationship of the second and first user identifications, so as to bind them together.

For example, the application server of the social application may receive the binding request, and store the second user identification Phone1 and the application account number IM1 of the application account carried in the binding request in a relationship of second and first user identifications as shown in Table 5, so as to bind the second user identification Phone1 and the application account number IM5 together.

TABLE 5

| Second identification | Application account number |
|---|---|
| Phone1 | IM1 |
| Phone2 | IM2 |
| Phone3 | IM3 |
| Phone4 | IM4 |
| ... | ... |

Figure 2E:
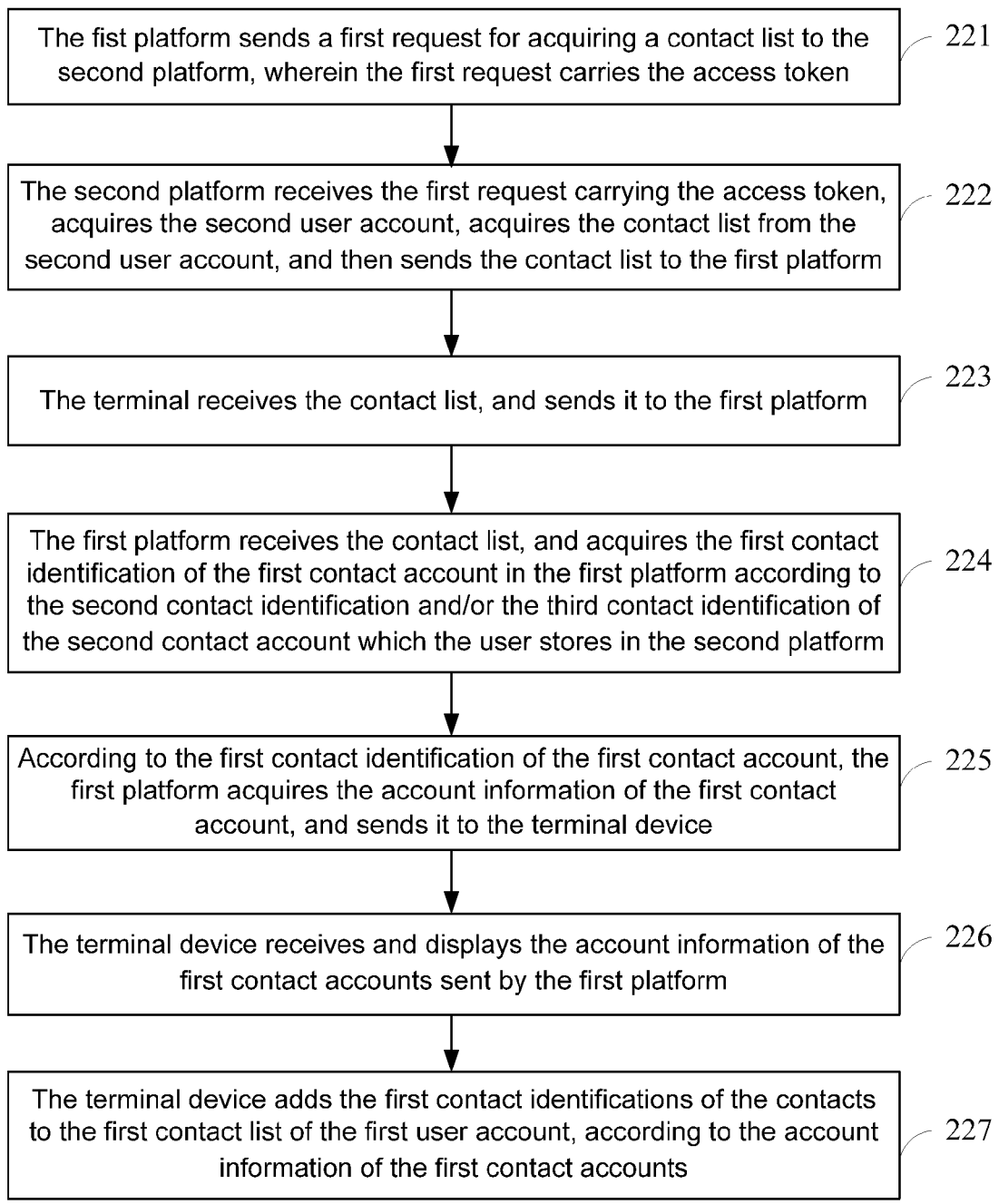
FIG. 2E is a flowchart of a method for providing account information according to the second example embodiment of the present disclosure.

FIG. 2E is a flowchart of a method for providing account information according to the second example embodiment of the present disclosure. The method provides steps 221 to 227 to acquire the account information of the contact stored in the first user account of the first platform, according to the second or the third user identification of the contact included in the contact list.

Step 221, the terminal may send a first request for acquiring a contact list to a second platform, wherein the first request carries the access token.

For example, through the first platform, the terminal device may send the first request for acquiring a contact list to the E-mail service platform, and the first request may carry the access token A.

Step 222, the second platform may receive the first request carrying the access token, acquires the second user account, acquires the contact list from the second user account, and then may send the contact list to the terminal through the first platform. Wherein, the contact list includes a second contact identification of the contact of the user in the second platform, and/or a third contact identification of the contact in the second account.

The process of second platform acquiring the second user account according to the access token carried in the first request may include:

According to the access token carried in the first request, the second platform may acquire the third user identification of the second user account from the stored relationship of the third user identification and the access token, or acquires the third user identification of the second user account by an inverse operation to the access token carried in the first request, by which the second user account may be determined.

For example, the E-mail service platform may receive the first request, according to the access token A carried in the first request, the E-mail service platform may acquire the E-mail address Email1 of the E-mail account of the user from the stored relationship between the E-mail address Email1 and the access token as shown in Table 3; or acquire the E-mail address Email1 by an inverse operation to the access token A carried in the first request, and then determine the E-mail account C of the user according to the E-mail address Email1. After that, the E-mail service platform may obtain the contact list List1 from the E-mail account C, and the contact list List1 may include the second contact identification which the user stores in the E-mail service platform, and/or the E-mail addresses Email2, Email3, and Email4 of the E-mail account of the contact.

Finally, the E-mail service platform may send the contact list List1 to the terminal through the first platform.

Step 223, the terminal may receive the contact list, and may send it to the first platform.

For example, the terminal may receive the contact list List1, and send it to the application server of the social application.

Step 224, the first platform may receive the contact list, and acquires the first contact identification of the first contact account in the first platform according to the second contact identification and/or the third contact identification of the second contact account which the user stores on the second platform.

In this step, according to the third contact identification of the second contact account, which the user stores in the contact list of his second user account in the second platform, the first platform may search the stored relationship of the third and first contact identifications, if the corresponding first contact identification is found, the terminal may determine that the first contact identification is the right first contact identification bound to the third contact identification.

Further, according to the second contact identification which the user stores in the contact list of the second user account, the first platform may search the stored relationship of the second and first contact identifications. If the first platform finds the corresponding first contact identification, the first platform may determine that the found first contact identification may be the right first contact identification bound to the second contact identification.

For example, the application server of the social application may receive the contact list List1, and according to E-mail addresses Email2, Email3, Email4 of the E-mail account of the contact which the user stores in the E-mail service platform in the contact list List1, the application server may search the stored relationship of the E-mail address and the application account shown in Table 4 and then search out the corresponding application accounts IM2, IM3 and M4, and then determines that the application accounts IM2 may be the one bound to the E-mail address Email2, the application accounts IM3 may be the one bound to the E-mail address Email3, the application accounts IM4 may be the one bound to the E-mail address Email4.

Further, according to the second contact identifications Phone2, Phone3 and Phone4 which the user stores in the in the contact list List1 of the E-mail service platform, the application server of the social application also may search the stored relationship of the second contact identification and the application account shown in Table 5 and then search out the corresponding application accounts IM2, IM3 and M4, and then determine that the application account IM2 may be the one bound to the second contact identification Phone2, the application account IM3 may be the one bound to the second contact identification Phone3, the application account IM4 may be the one bound to the second contact identification Phone4.

Step 225, according to the first contact identification of the first contact account, the first platform acquires the account information of the first contact account, and may send it to the terminal device.

In this step, the account information in the first account for any user (such as the user Harry and his contact Alyssa, if Alyssa also has an account on the first platform) may at least include information of the first identification of the first account and the title thereof.

For example, according to the application account numbers IM2, IM3 and M4 of the application account which pertain to the user's contacts in the social application, the application server of the social application may acquire the account information N2, N3 and N4 of the corresponding application account, and then send the account information N2, N3 and N4 to the terminal device.

Step 226, the terminal device may receive and displays the account information of the first contact accounts sent by the first platform.

In this step, the terminal device may receive and display the account information of the first contact accounts, so as to let the user choose account information of the first contact account of a contact who he wants to add.

For example, the terminal device may receive and display the account information N2, N3 and N4 of the first contact accounts from his contact list sent by the first platform.

Further, the terminal device may further send the access token to the first platform while sending the contact list, and then the first platform may receive and store the access token and the contact list.

And then, according to the contact list stored, the first platform may periodically check the contact list in the second user account. If there are any new contact added or any updates from existing contacts, the first platform may acquire the second and/or third contact identification of the new contacts or updated second contact identification of the existing contacts, and send the second and/or third contact identifications of the new contacts and updated contacts to the terminal device. The operation may include:

Firstly, the first platform may send the first request for acquiring the contact list to the second platform, and the first request may carry the access token. The second platform may receive the access token, acquire the second user account according to the access token, and then acquire the contact list from the second user account. Then, the first platform may receive the contact list from the second platform, compare the stored contact list with the received contact list, and determine the second contact identification and/or the third contact identification of the new contact who is recently created during this period (the period after the previous check), and/or the third contact identification of the second account of the new contact. The first platform then may obtain the first contact identification of the first contact account of the new contact that is bound with the second contact identification and/or the third contact identification of the second contact account. Finally, the first platform may send to the terminal device the account information of the first contact account corresponding to the first contact identification of the new contact.

Further, the first platform may update the stored contact list with the received contact list.

For example, the application server of the social application may send the first request for acquiring the contact list to the E-mail service platform, and the message carries the access token A. Then the application server of the social application may receive the access token A, and acquire the E-mail account according to the access token A and further acquire the contact list List2 according to the E-mail account. The contact list List2 includes the E-mail addresses Email2, Email3, Email4, Email5 and Email6, which may be sent to the application server of the social application. After receiving the contact list List2, the application server of the social application may compare the stored contact list List1 with the received contact list List2, and determine who is the new contact and his/her corresponding E-mail addresses Email5 and Email6. And then, the application server of the social application may acquire the application identification IM5 and IM6 of application account of the new contact which are bound to the E-mail addresses Email5 and Email6, and then acquire the account information N5 and N6 of the application account which are associated with the application identification IM5 and IM6 respectively, then send the account information N5 and N6 to the terminal device. Furthermore, the application server of the social application may subsequently update the stored contact list List1 with the received contact list List2.

Further, the terminal device may store the contact list received in the step 224. The terminal device may also periodically acquire the second contact identification and/or the third contact identification of the second contact account of the new contact by conduct the following operations:

The terminal device may periodically send the first request carrying the access token to the second platform, and the second platform may receive the access token and acquire the second account and the contact list accordingly, and then may send the contact list to the terminal device through the first platform. The terminal device may receive the contact list, and compare the stored contact list with the received contact list to determine the second and/or the third contact identification of the new contact who was recently created. The terminal device then may send the second and/or third contact information to the first platform. Alternatively, the above comparison and determination of the second and/or third contact identification of the new contact may also be performed by the first platform. Thus the first platform may acquire the first contact identification corresponding to the first contact account of the new contact, which is bound to the second and third contact identification of the new contact. With the first contact identification, the first platform may acquire the account information of the first contact account corresponding to the first contact identification. The account information then may be sent to and received by the terminal device.

The terminal device and/or the first platform may then update the stored contact list with the received contact list.

For example, the terminal device may send the first request for acquiring the contact list to the application server of the social application, wherein the message carries the access token A. The E-mail service platform may receive the access token A, and acquire the E-mail account according to the access token A and the contact list List2 according to the E-mail account. The E-mail service platform then may send the contact list List2, which may include the E-mail addresses Email2, Email3, Email4, Email5 and Email6, to the terminal device through the application server of the social application. After receiving the contact list List2, the terminal device may compare the stored contact list List1 with the received contact list List2, and determine a new contact and the corresponding new the E-mail addresses Email5 and Email6 therefrom. The terminal device then may send the new contact information, Email5, and Email6 to the application server of the social application. Alternatively, the server of the social application may conduct the comparison and determination by itself. The application server of the social application may then acquire the application identifications IM5 and IM6 of application account of the new contact bound to the E-mail addresses Email5 and Email6, and then acquire the account information N5 and N6 of the application account which may be associated with the application identifications IM5 and IM6 respectively. Then the application server may send the IM5, IM6, N5, and N6 to the terminal device. Subsequently, the terminal device (and/or the application server) may update the stored contact list List1 with the received contact list List2.

Step 227, the terminal device adds the first contact identifications of the contacts to the first contact list of the first user account, according to the account information of the first contact accounts.

After receiving the account information of the first accounts, the terminal device may display it to the user. The user may choose the account information of a first contact account who he/she wants to add. Accordingly, the terminal device may add the first identification of the contact to the first contact list in the first user account.

For example, the terminal device may display the account information N2, N3, N4 to the user IM1. The user IM1 may choose the account information N2 of the application account of the contact to add in his social application (e.g., WeChat) operating on the terminal device. Accordingly, the application account IM2 according to the account information N2 may be added to the first contact list included in the application account of the user IM1.

For example, in the example embodiment, a phone number may serve as the third user identification of the second user account. The terminal device may send a binding request to the application sever of the social application, carrying the phone number Phone1 of the user and the application identification IM1 of the user's application account.

The application server of the social application may receive the binding request, and store the phone number Phone1 of the user and the application account number IM1 of the application account in a relationship of phone number and application account number as shown in Table 6, so as to bind the phone number Phone1 and the application account number IM1 together.

TABLE 6

| Phone number | Application account number |
|---|---|
| Phone1 | IM1 |
| Phone2 | IM2 |
| Phone3 | IM3 |
| Phone4 | IM4 |
| ... | ... |

Specifically, it's the same operation to bind his phone number and his application account number of the application account for any one user.

If there is a need for recommending account information, the terminal device may send a first request for acquiring a contact list to the second platform through the first platform.

The second platform may receive the first request and obtain the phone number Phone1, and then determine a second account C accordingly. Then the contact list List1 may be obtained from the second account C, in which the phone numbers Phone2, Phone3 and Phone4 of the contacts may be included. And then such the contact list List1 may be sent to the terminal device through the first platform.

Accordingly, after receiving the contact list List1, the terminal device may send it to the application sever of the social application.

For example, the application server of the social application may receive the contact list List1, and according to phone numbers Phone2, Phone3 and Phone4 of the contacts which the user stores in the second platform and which may be included in the contact list List1, the application server may search the stored relationship of phone number and application account shown in Table 6, and then search out the corresponding application accounts IM2, IM3 and M4, and then determine that the application accounts IM2 that the application server found may be the one bound to the phone number Phone2, the application accounts IM3 that the application server found may be the one bound to the phone number Phone3, the application accounts IM4 the application server found may be the one bound to the phone number Phone4.

Accordingly, the social application may obtain the account information N2, N3, N4, and send the account information to the terminal device.

The terminal device may receive and displays the account information accordingly.

To this end, the terminal device may receive the account information N2, N3, N4, and then display it to the user IM1. The user IM1 may choose the account information N2 of the application account of the contact who he/she wants to add. Accordingly, the terminal device may add the contact's application account IM2 that corresponds with the account information N2 to the user's first contact list "List" in the user's application account of the user IM1.

As stated above, the example embodiments of the present disclosure may be applicable to an application scenario made up of a social application Wechat and Google. In this application scenario, the back-end server of Wechat may be served as the first platform, the Wechat account may be served as the first account, and the Wechat number related to the Wechat account may be served as the first identification of the first account. And the back-end server of Google may be served as the second platform, Google account may be served as the second account, and account number related to the Google account may be served as the third identification of the second account. Of course, the present example embodiment also can be used in other application scenarios, whose detailed description may be omitted here.

In this step, the second and third identification may be identification information with different types or the same type. For example, the second identification may be the phone number, instant messaging account or E-mail address, etc., and the third identification may be E-mail address or phone number, etc.

Figure 3:
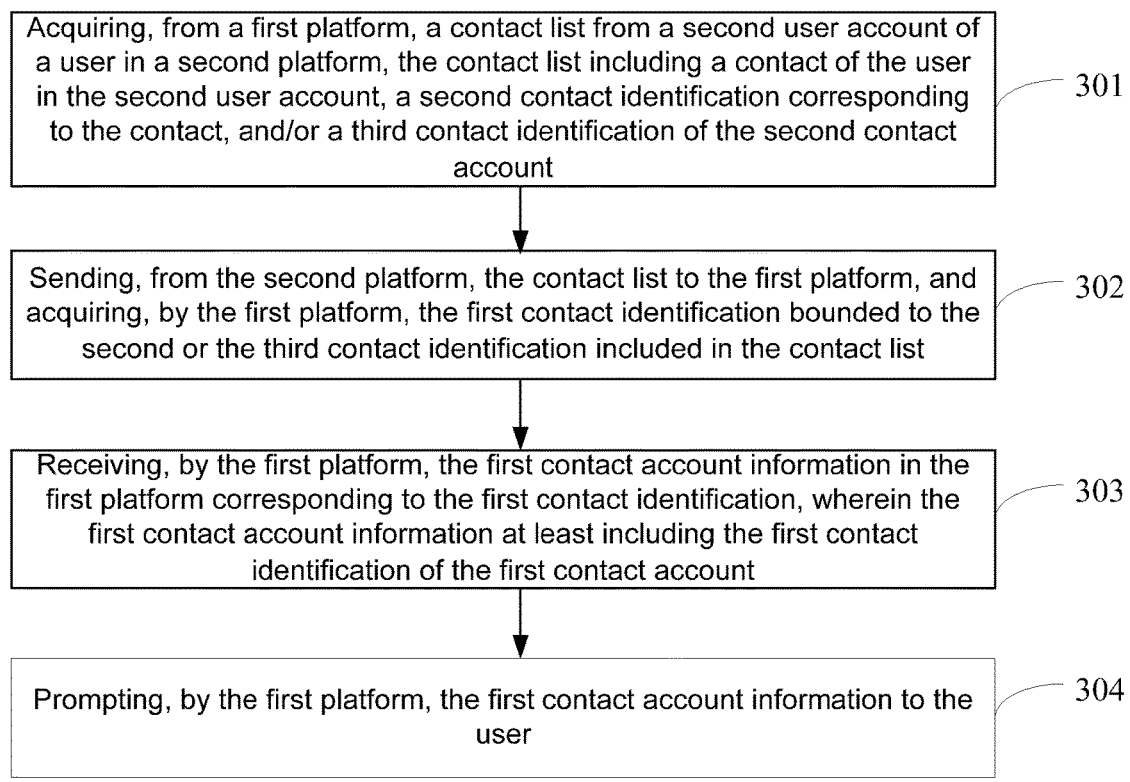
FIG. 3 is a flowchart of a method for providing account information according to a third example embodiment of the present disclosure.

FIG. 3 is a flowchart of a method for providing account information according to a third example embodiment of the present disclosure. The method may include following steps:

Step 301, acquiring, from a first platform, a contact list from a second user account of a user in a second platform, the contact list including a contact of the user in the second user account, a second contact identification corresponding to the contact, and/or a third contact identification of the second contact account;

Step 302, sending, from the second platform, the contact list to the first platform, and acquiring, by the first platform, the first contact identification bounded to the second or the third contact identification included in the contact list;

Step 303, receiving, by the first platform, the first contact account information on the first platform corresponding to the first contact identification, wherein the first contact account information at least including the first contact identification of the first contact account; and Step 304, prompting the first contact account information.

Step 301 may include: sending a first request carrying an access token for acquiring the contact list to the second platform, rendering and/or instructing the second platform acquire the second user account according to the access token and then obtain the contact list from the second user account; and receiving the contact list sent by the second platform.

Before this step the method may further include: acquiring the third user identification, and sending a binding request carrying the first user identification of the first user account and the third user identification to the first platform, so as to bind the first user identification with the third user identification; or acquiring the second user identification, and sending a binding request carrying the first user identification and the second user identification to the first platform, so as to bind the first user identification of the first user account with the second user identification.

The step of acquiring the third user identification may include: sending a second request carrying an access token for acquiring the third user identification to the second platform, rendering and/or instructing the second platform acquire the third user identification of the second user account according to the access token; and receiving a response message for acquiring the third identification sent by the second platform, the response message carrying the third user identification.

Further, before Step 301, the method may further include: requesting the second platform to build an access token according to stored application identification.

To this end, the method may further include: sending a validation request carrying the application identification to the second platform; receiving a login page returned by the second platform according to the application identification, and receiving the third user identification and a password entered by the user via the login page; sending an authorization message to the second platform, rendering and/or instructing the second platform build the access token according to the third user identification and the password of the user; and receiving the access token returned by the second platform.

Furthermore, after Step 301, the method may further include: storing the contact list, and periodically acquiring the second contact identification of a new contact who may be recently created, and/or the third contact identification of the second contact account of the new contact, accordingly.

The step of storing the contact list and periodically acquiring the second contact identification and/or the third contact identification of the second contact account of the new contact may further include: periodically acquiring the contact list included in the second user account in the second platform; determining the second contact identification of the new contact and/or the third contact identification of the second contact account of the new contact, according to the stored contact list and the contact list obtained periodically; sending the second contact identification of the new contact and/or the third contact identification of the second contact account of the new contact to the first platform, rendering and/or instructing the first platform acquire the first contact identification bound to the second contact identification of the new contact of the user and/or the third identification of the second account of the new contact; and receiving, by the terminal device, the account information of the first contact account corresponding to the first contact identification sent by the first platform.

The step of prompting the account information of the first contact accounts may include prompting the user in the first platform with the account information of the first contact accounts of the user.

Figure 4:
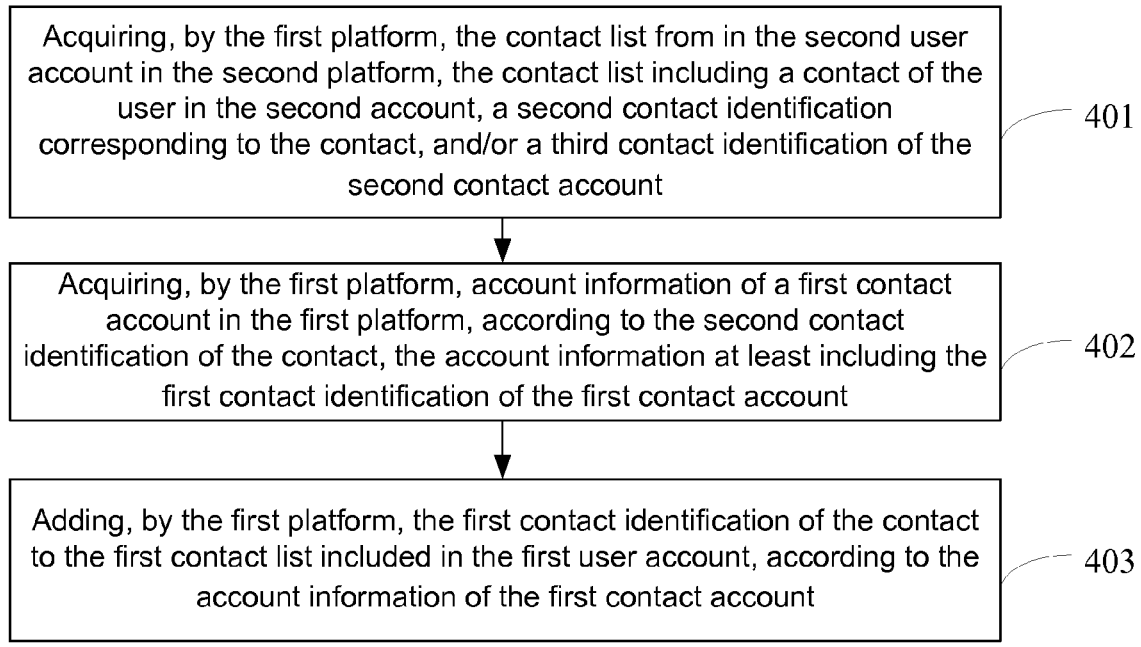
FIG. 4 is a flowchart of a method for importing a relation chain according to a fourth example embodiment of the present disclosure.

FIG. 4 is a flowchart of a method for importing a relation chain according to a fourth example embodiment of the present disclosure. The method includes following steps:

Step 401, acquiring, by the first platform, the contact list from the second user account in the second platform, the contact list including a contact of the user in the second user account, a second contact identification corresponding to the contact, and/or a third contact identification of the second contact account;

Step 402, acquiring, by the first platform, account information of a first contact account in the first platform, according to the second contact identification of the contact, the account information at least including the first contact identification of the first contact account; and Step 403, adding, by the first platform, the first contact identification of the contact to the first contact list included in the first user account, according to the account information of the first contact account.

The step of acquiring the contact list included in the second user account in the second platform may include: sending a first request carrying an access token for acquiring the contact list to the second platform, rendering and/or instructing the second platform to acquire the second user account according to the access token and then acquire the contact list from the second user account; and receiving the contact list sent by the second platform.

The step of acquiring account information of a first contact account in the first platform, according to the second and/or the third contact identification may include: searching a relationship between the third contact identification and the first contact identification stored in the first platform according to the third contact identification included in the contact list, if the first contact identification corresponding to the third contact identification is found, then acquiring the account message of the first contact account to which the first contact identification corresponds; and/or searching a relationship between the second contact identification and the first contact identification stored in the first platform according to the second contact identification included in the contact list, if the first contact identification corresponding to the second contact identification is found, acquiring the account message of the first contact account to which the first contact identification corresponds.

Furthermore, before acquiring the contact list included in the second user account in the second platform, the method may further include: requesting the second platform to build an access token according to the stored application identification.

The step of requesting the second platform to build the access token may further include: sending a validation request carrying the application identification to the second platform; receiving a login page returned by the second platform according to the application identification, and receiving the third user identification and a password entered by the user via the login page; sending an authorization message to the second platform, rendering and/or instructing the second platform to build the access token according to the third identification and the password of the user; and receiving the access token returned by the second platform.

Figure 5:
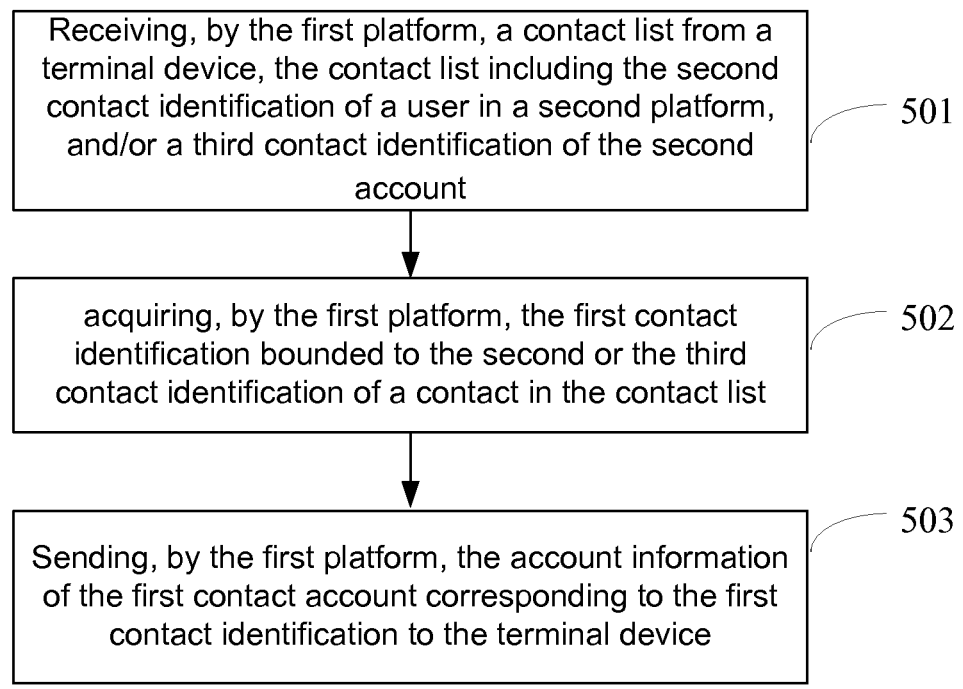
FIG. 5 is a flowchart of a method for providing account information according to a fifth example embodiment of the present disclosure.

FIG. 5 is a flowchart of a method for providing account information according to a fifth example embodiment of the present disclosure. The method may include following steps.

Step 501, receiving, by the first platform, a contact list from a terminal device, the contact list including the second contact identification of a user in a second platform, and/or a third contact identification of the second account;

Step 502, acquiring, by the first platform, the first contact identification bounded to the second or the third contact identification of a contact (or more contacts) in the contact list; and Step 503, sending, by the first platform, the account information of the first contact account corresponding to the first contact identification to the terminal device.

In this example embodiment, the first platform may receive the contact list sent by the terminal device, and the contact list may include a contact of the user in the second user account, a second contact identification corresponding to the contact, and/or a third contact identification of the second contact account. The first platform may receive the first contact identification bound to the second or the third contact identification, and then send the account information of the first contact account according to the first contact identification, so that the user may add the contact in the second platform to the first contact list on the first user account in the first platform.

Figure 6:
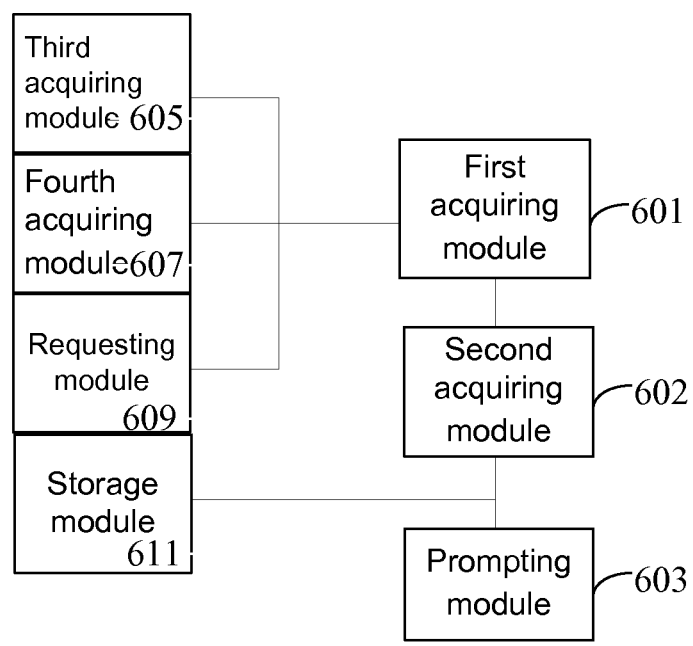
FIG. 6 is a structural schematic view of a device for providing account information according to a sixth example embodiment of the present disclosure.

FIG. 6 is a structural schematic view of a device for providing account information according to a sixth example embodiment of the present disclosure. The device may server as the first platform, part of the first platform, the terminal device, or a combination thereof. The device may include:

A first acquiring module 601, configured to acquire the contact list included in the second user account of the user in the second platform, wherein the user has a first user account on the first platform. The contact list may include a contact of the user in the second account, the second contact identification corresponding to the contact, and/or a third contact identification of the second contact account;

A second acquiring module 602, configured to acquire the account information of the first contact account of the contact in the first platform, according to the second or the third contact identification of the contact, the account information at least including the first contact identification of the first contact account; and A prompting module 603, configured to prompt the account information of the first contact account.

The first acquiring module 601 may further include: a first sending unit, configured to send the first request carrying the access token for acquiring the contact list to the second platform, render and/or instruct the second platform to acquire the second user account according to the access token and then acquire the contact list from the second user account; and a receiving unit, configured to receive the contact list sent by the second platform.

The second acquiring module 602 may further include: a first searching unit, configured to search a relationship between the third contact identification and the first contact identification stored in the first platform according to the third contact identification of the contact included in the contact list. If the first contact identification corresponding to the third contact identification of the contact is found, the second acquiring module may acquire the account message of the first contact account to which the first contact identification corresponds; and/or a second searching unit, configured to search a relationship between the second contact identification and the first contact identification stored in the first platform according to the second contact identification included in the contact list. If the first contact identification corresponding to the second contact identification is found, the second acquiring module 602 may acquire the account message of the first contact account to which the first contact identification corresponds.

Additionally, the device may further include:

A third acquiring module 605, configured to acquire the third user identification, and send a binding request carrying the first user identification of the first user account and the third user identification to the first platform, so as to bind the first user identification of the first user account to the third user identification; and A fourth acquiring module 607, configured to acquire the second user identification, and send a binding request carrying the first user identification of the first user account and the second user identification to the first platform, so as to bind the first user identification of the first user account to the second user identification.

The third acquiring module 605 may further include: a second sending unit, configured to send a second request carrying an access token for acquiring the third user identification to the second platform, rendering and/or instructing the second platform to obtain the third user identification of the second user account according to the access token; and a second receiving unit, configured to receive from the second platform a response message carrying the third user identification.

Furthermore, the device may further include a request module 609, configured to request the second platform to build an access token according to the stored application identification.

The request module 609 may include: a third sending unit, configured to send a validation request carrying the application identification to the second platform; a third receiving unit, configured to receive a login page returned by the second platform according to the application identification, and receive the third user identification and a password entered by the user via the login page; a fourth sending unit, configured to send an authorization message to the second platform, rendering and/or instructing the second platform to build the access token according to the third user identification and the password of the user; and a fourth receiving unit, configured to receive the access token returned by the second platform.

Furthermore, the device further includes a storage module 611, configured to store the contact list, and periodically acquire the second contact identification of the new contact being recently created, and/or the third contact identification of the second contact account of the new contact, accordingly. The storage module 611 may include:

An acquiring unit, configured to periodically acquire the contact list included in the second user account in the second platform;

A determining unit, configured to determine the second contact identification of the new contact and/or the third contact identification of the second contact account of the new contact, according to the stored contact list and the periodically acquired contact list;

A fifth sending unit, configured to send the second contact identification of the new contact and/or the third contact identification of the second contact account of the new contact to the first platform, rendering and/or instructing the first platform to acquire the first contact identification bound to the second contact identification of the new contact and/or the third contact identification of the second contact account of the new contact; and A fifth receiving unit, configured to receive the account information of the first contact account corresponding to the first contact identification sent by the first platform.

Moreover, the prompting module 603 may include a prompting unit, configured to prompting the user in the first platform with the account information of the first contact account of the user.

In this example embodiment, the first platform may acquire the contact list included in a second account of a user in a second platform, wherein the user may be in a first platform, and the contact list may include the contact of the user in the second account, a second contact identification corresponding to the contact, and/or a third contact identification of the second contact account. The first platform thus may obtain the account information of the first contact account in contact in the first platform according to the second or the third contact identification of the contact, and the contact's account information may at least include the first contact identification of the first contact account. And finally, the first platform may prompt the account information of the first contact account to the user, so that the user may add the contact to the first contact list of the first user account in the first platform, thereby extending the relation chain of the user. In addition, the first platform may periodically acquire the account information of the first contact account of the new contact, so that the user may add the first contact identification of the first contact account of the new contact in time.

Figure 7:
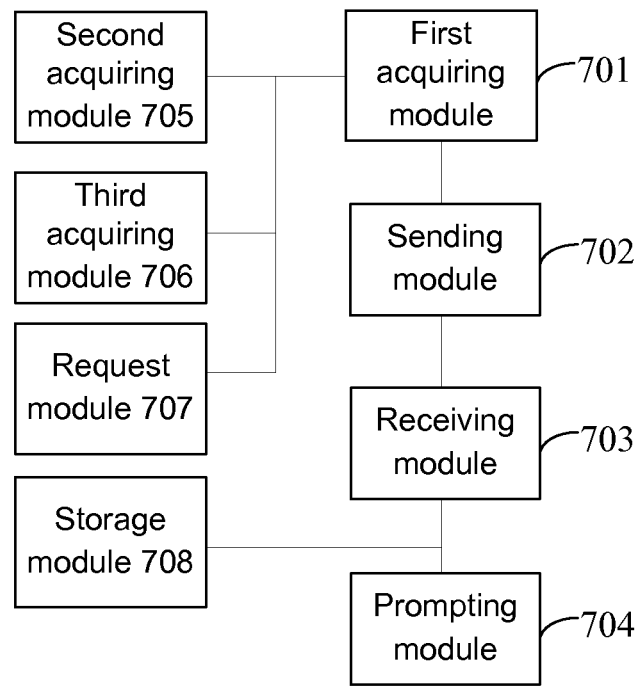
FIG. 7 is a structural schematic view of a device for providing account information according to a seventh example embodiment of the present disclosure.

FIG. 7 is a structural schematic view of a device for providing account information according to a seventh example embodiment of the present disclosure. The device may include the following modules:

A first acquiring module 701, configured to acquire the contact list included in the second account of the user in the second platform, the contact list including a contact of the user in the second user account, a second contact identification corresponding to the contact, and/or a third contact identification of the second contact account;

A sending module 702, configured to send the contact list to the first platform, rendering and/or instructing the first platform to acquire the first contact identification bounded to the second or the third contact identification included in the contact list;

A receiving module 703, configured to receive the account information, corresponding to the first contact identification, of the first contact account in the first platform, and the account information at least including the first contact identification of the first contact account; and A prompting module 704, configured to prompt the account information of the first contact account to the user.

The first acquiring module 701 may include: a first sending unit, configured to send a first request carrying an access token for acquiring the contact list to the second platform, rendering and/or instructing the second platform to acquire the second user account according to the access token and then acquire the contact list from the second user account; and a first receiving unit, configured to receive the contact list sent by the second platform.

The device may further includes:

A second acquiring module 705, configured to acquire the third user identification, and send a binding request carrying the first user identification of the first user account and the third user identification to the first platform, so as to bind the first user identification of the first user account with the third user identification; or A third acquiring module 706, configured to acquire the second user identification, and sending a binding request carrying the first user identification of the first user account and the second user identification to the first platform, so as to bind the first user identification of the first user account with the second user identification.

The second acquiring module may further include: a second sending unit, configured to send a second request carrying an access token for acquiring the third user identification to the second platform, rendering and/or instructing the second platform to acquire the third user identification of the second user account according to the access token; and a second receiving unit, configured to receive a response message for acquiring the third user identification sent by the second platform, the response message carrying the third user identification.

The device may further include a request module 707, configured to request the second platform to build an access token according to stored application identification. The request module 707 includes:

A third sending unit, configured to send a validation request carrying the application identification to the second platform;

A third receiving unit, configured to receive a login page returned by the second platform according to the application identification, and receiving the third user identification and a password entered by the user via the login page;

A fourth sending unit, configured to send an authorization message to the second platform, rendering and/or instructing the second platform to build the access token according to the third user identification and the password of the user; and A fourth receiving unit, configured to receive the access token returned by the second platform.

Further, the device may include a storage module 708, configured to store the contact list, and periodically acquire the second contact identification of a new contact who may be recently created, and/or the third contact identification of the second contact account of the new contact, accordingly. The storage module may include:

An acquiring module, configured to periodically acquire the contact list included in the second user account in the second platform;

A determining module, configured to determine the second contact identification of the new contact of the user created in one period and/or the third contact identification of the second contact account of the new contact, according to the stored contact list and the periodically obtained contact list;

A fifth sending module, configured to send the second contact identification of the new contact of the user and/or the third contact identification of the second contact account of the new contact to the first platform, rendering and/or instructing the social platform to acquire the first contact identification bound to the second contact identification of the new contact of the user and/or the third contact identification of the second contact account of the new contact; and A fifth receiving module, configured to receive the account information of the first contact account corresponding to the first contact identification sent by the first platform.

The prompting module 704 may include a prompting unit, configured to prompt the user in the first platform with the account information of the first contact account of the contact.

Figure 8:
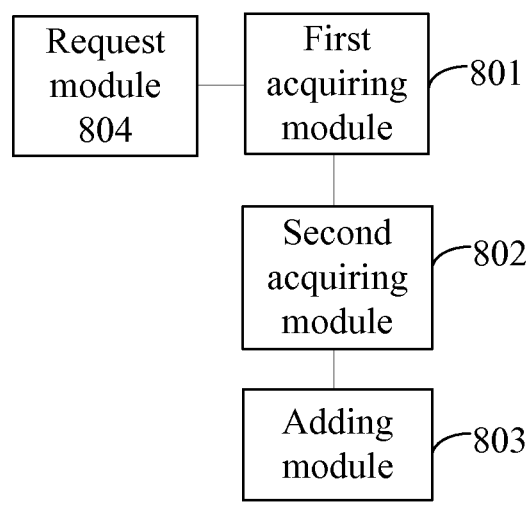
FIG. 8 is a structural schematic view of a device for importing a relation chain according to an eighth example embodiment of the present disclosure.

FIG. 8 is a structural schematic view of a device for importing a relation chain according to an eighth example embodiment of the present disclosure. The device may include the following modules:

A first acquiring module 801, configured to acquire the contact list included in the second user account in a second platform, the contact list including the contact of the user in the second account, the second contact identification corresponding to the contact, and/or a third contact identification of the second contact account;

A second acquiring module 802, configured to acquire account information of a first contact account in the first platform, according to the second or third contact identification of the contact, the account information at least including the first contact identification of the first contact account; and An adding module 803, configured to add the first contact identification of the contact to the first contact list included in the first user account, according to the account information of the first contact account.

The first acquiring module 801 may further include: a first sending unit, configured to send a first request carrying an access token for acquiring the contact list to the second platform, rendering and/or instructing the second platform to acquire the second user account according to the access token and then acquire the contact list from the second user account; and a receiving unit, configured to receive the contact list sent by the second platform.

The second acquiring module 802 may further include:

A first searching unit, configured to search a relationship between the third contact identification and the first contact identification stored in the first platform according to the third contact identification of the contact included in the contact list. If the first contact identification corresponding to the third contact identification of the contact is found, the second acquiring module 802 may acquire the account message of the first contact account to which the first contact identification corresponds; and/or A second searching unit, configured to search a relationship between the second contact identification and the first contact identification stored in the first platform according to the second contact identification included in the contact list. If the first contact identification corresponding to the second contact identification is found, the second acquiring module 802 may acquire the account message of the first contact account to which the first contact identification corresponds.

Further, the device may include a request module, configured to request the second platform to build an access token according to stored application identification. The request module may include: a second sending unit, configured to send a validation request carrying the application identification to the second platform; a second receiving unit, configured to receive a login page returned by the second platform according to the application identification, and receiving the third user identification and a password entered by the user via the login page; a third sending unit, configured to send an authorization message to the second platform, rendering and/or instructing the second platform to build the access token according to the third identification and the password of the user; and a third received unit, configured to receive the access token returned by the second platform.

Figure 9:
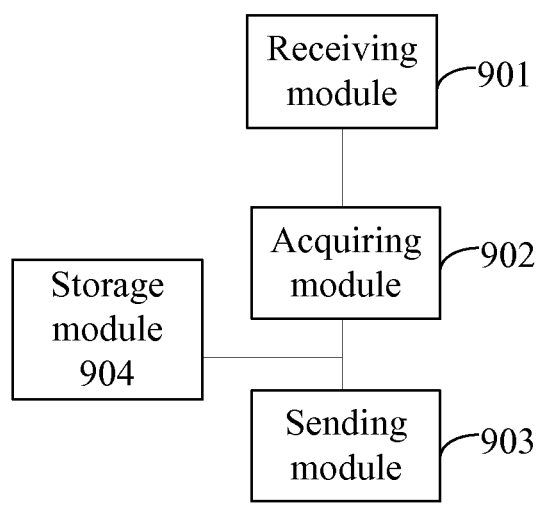
FIG. 9 is a structural schematic view of a device for providing account information according to a ninth example embodiment of the present disclosure.

FIG. 9 is a structural schematic view of a device for providing account information according to a ninth example embodiment of the present disclosure. The device may include the following modules:

A receiving module 901, configured to receive a contact list sent by a terminal device, the contact list including a second contact identification of a contact of a user in a second platform, and/or a third contact identification of second account;

An acquiring module 902, configured to acquire first contact identification bounded to the second or the third contact identification included in the contact list; and A sending module 903, configured to send the account information of the first contact account corresponding to the first contact identification to the terminal device.

The acquiring module 902 may include:

A first searching unit, configured to search the stored relationship between the third contact identification and the first contact identification according to the third contact identification included in the contact list; if the first contact identification corresponding to the third contact identification is found, the acquiring module 902 may determine the first contact identification to be the first contact identification bound to the third contact identification; and/or A second searching unit, configured to search a stored relationship between the second contact identification and the first contact identification according to the second contact identification included in the contact list; if the first contact identification corresponding to the second contact identification is found, the acquiring module 902 may determine that the first contact identification to be the first contact identification bound to the second contact identification.

The acquiring module 902 may further include:

a first receiving unit, configured to receive a binding request sent by the terminal device, the binding request carrying the second user identification and the first user identification of the first user account, and then binding the second user identification and the first user identification of the first user account; or a second receiving unit, configured to receive a binding request sent by the terminal device, the binding request carrying the third user identification and the first user identification of the first user account, and then binding the third user identification and the first user identification of the first user account.

Further, the device may include a storage module 904, configured to storing the contact list, and periodically acquire the second identification of the new contact who may be recently created, and/or the third contact identification of the second account of the new contact accordingly, and then send the second contact identification of the new contact and/or the third contact identification of the second account of the new contact to the terminal device.

In this example embodiment, the first platform may receive the contact list sent by the terminal device, wherein the contact list may include a contact of the user in the second account, a second contact identification corresponding to the contact, and/or a third contact identification of the second contact account. The first platform may also receive the first contact identification bound to the second or the third contact identification, and then send the account information of the first account according to the first contact identification to the terminal device, so that the user can add the contact in the second platform to the first contact list on the first user account in the first platform, thereby extending the relation chain of the user.

Figure 10:
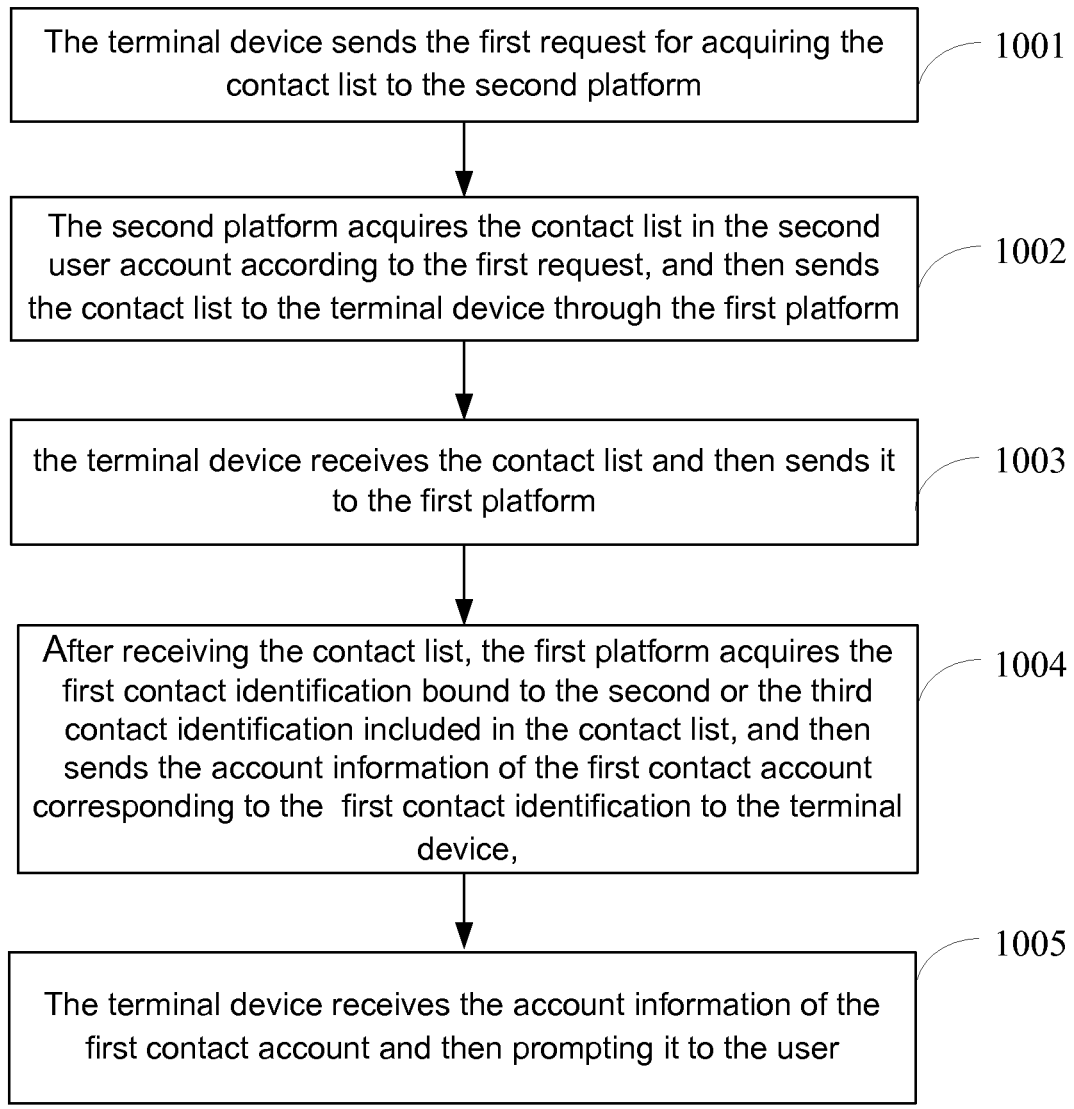
FIG. 10 is a flowchart of a method for providing account information according to a tenth example embodiment of the present disclosure.

FIG. 10 is a flowchart of a method for providing account information according to a tenth example embodiment of the present disclosure. The method may include the following steps.

Step 1001, the terminal device sends the first request for acquiring the contact list to the second platform through the first platform;

Step 1002, the second platform acquires the contact list included in the second user account in the second platform according to the first request, wherein the contact list includes the contact of the user in the second account, the second contact identification corresponding to the contact, and/or a third contact identification of the second contact account, and then sends the contact list to the terminal device through the first platform;

Step 1003, the terminal device receives the contact list and then sends it to the first platform;

Step 1004, after receiving the contact list, the first platform acquires the first contact identification bound to the second or the third contact identification included in the contact list, and then sends the account information of the first contact account corresponding to the above acquired first contact identification to the terminal device, wherein the account information at least includes the first contact identification of the first contact account, and then prompt the account information of the first account; and Step 1005, the terminal device receives the account information of the first contact account and then prompting it to the user.

In this example embodiment, the terminal device may send the first request for acquiring the contact list to the second platform, then the second platform may acquire the list accordingly, and the contact list includes a contact of the user in the second account, a second identification corresponding to the contact, and/or a third identification of the second contact account. And then such a list may be sent to the terminal device and then received. Subsequently, the list may be sent to the first platform and then received by the terminal device. Accordingly, the first identification bound to the second or the third identification included in the list may be acquired. Accordingly, the account information of the first contact account corresponding to the first contact identification may be acquired. And the account information with the first contact identification may be prompted by the terminal device, so that the user can add the contacts in the second platform to the first contact list on the first account in the first platform, thereby extending the relation chain of the user.

Figure 11:
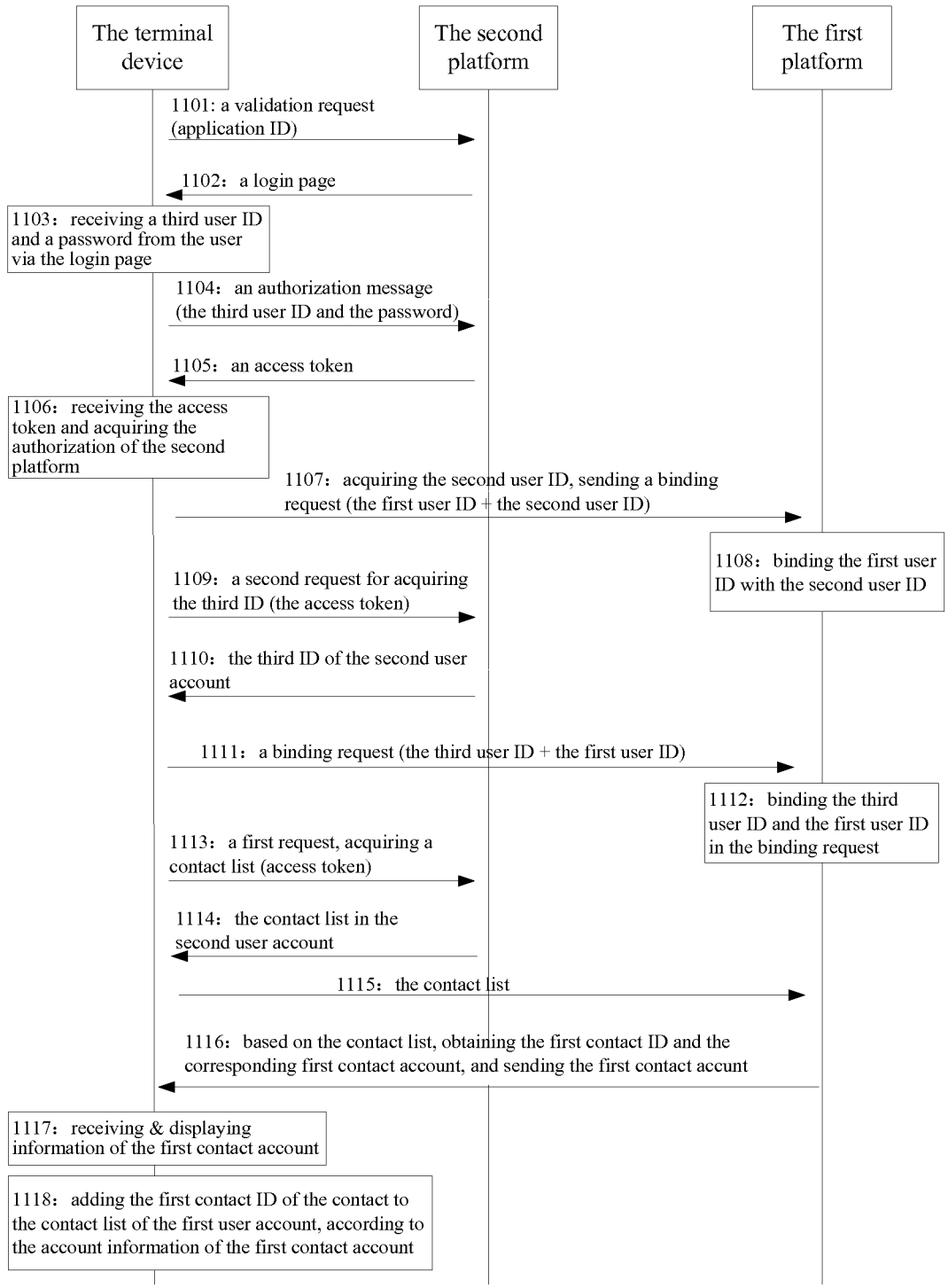
FIG. 11 is a flowchart of a method for providing account information according to an eleventh example embodiment of the present disclosure.

FIG. 11 is a flowchart of a method for providing account information according to an eleventh example embodiment of the present disclosure. In this method, the terminal device may send information and/or instruction to and receive information and/or instruction from the second platform via the first platform. The method includes following steps.

Step 1101, the terminal device sends a validation request, carrying the application identification to the second platform. The validation request may be sent through the first platform.

In this step, the application identification may be stored in the terminal device in advance. The application identification may be generated by the second platform when developers of the application register the terminal device on the second platform, and then the developers may store the generated application identification in the terminal device.

In this step, after generating the application identification, the second platform may further generate the login page, and then store the application identification and the login page in a relationship between the application identification and the login page.

Step 1102, the second platform acquires a login page according to the application identification and sends it to the terminal device.

In this step, the second platform may receive the validation request carrying the application identification, and then may obtain the login page of the second user account from the stored relationship, and finally may send it to the terminal device.

Step 1103, the terminal device receives the login page and then receives a third user identification and a password entered by the user via the login page;

In this step, the terminal device may receive the login page and display it, in which a third user identification input box and a password input box may be included, so that the user can enter the third user identification and password therefrom. The terminal may read the third user identification and password via the login page.

Step 1104, the terminal device sends an authorization message carrying the third user identification and the password to the second platform.

Step 1105, the second platform receives the authorization message and generates an access token accordingly, and then sends the access token to the terminal device.

In this step, the second platform may receive the authorization message carrying the third user identification of the second user account, then may obtain a corresponding password from the stored corresponding relation of the third user identification and the password. The second platform may compare the stored password with the password carried in the authorization message. If the stored password matches the received password, the second platform may generate the access token and send it to the terminal device. In this step, the access token may be used for identifying the third user identification of the second user account. If, however, the stored password does not match the received password, the second platform may terminate the operation and does not generate the access token.

Further, the second platform may also store the third user identification and the access token in a corresponding relationship between the third user identification and the access token.

In order to conduct the above operation, the user may have registered the second user account on the second platform with the third user identification and password, and the second platform may have stored them in a corresponding relationship.

In this step, the second user account may further include a second contact identification of the user's contact, and/or the third contact identification of the contact in the second contact account.

Step 1106, the terminal device receives the access token, so as to acquire the authorization of the second platform.

Step 1107, the terminal device acquires the second user identification, and sends a binding request to the first platform, wherein the binding request carries the first user identification and the second user identification.

Step 1108, the first platform binds the first user identification and the second user identification.

Step 1109, the terminal device sends a second request for acquiring the third user identification to the second platform, the second request carrying the access token.

Step 1110, second platform obtains the third user identification of the second user account according to the access token carried in the second request, and then sends a response message carrying the third user identification of the second user account to the terminal device.

In this step, the second platform may receive the second request, then acquire the third user identification of the second user account from the stored relationship between the third user identification and the access token, according to the access token carried in the second request; or acquire the third user identification of the second user account by an inverse operation to the access token carried in the second request. And then, the second platform may send the response message carrying the third user identification of the second user account to the terminal device.

Step 1111, the terminal device obtains the third identification, and sends a binding request to the first platform, the binding request carries the third user identification of the second user account and the first user identification of the first user account.

Step 1112, the first platform binds the first user identification and the third user identification in the binding request.

Step 1113, the terminal device sends a first request, acquiring a contact list to a second platform, the first request carrying the access token.

Step 1114, the second platform obtains the contact list of the second user account according to the token in the first request, and then sends it to the terminal device. Wherein, the contact list includes a second contact identification in the second platform, and/or a third contact identification in the second account.

In this step, the second platform may receive the first request carrying the access token, then may obtain the second user account and then obtain the contact list from the second user account, and then may send the contact list to the terminal device. Wherein, the contact list includes a second contact identification of the contact in the second platform, and/or a third contact identification of the contact in the second contact account.

The process of second platform acquiring the second user account according to the access token carried in the first request may further include:

According to the access token carried in the first request, the second platform may obtain the third user identification of the second user account from the stored relationship of the third user identification and the access token, or acquire the third user identification of the second user account by an inverse operation to the access token carried in the first request, by which the second user account can be determined.

Step 1115, the terminal device receives the contact list, and sends it to the first platform.

Step 1116, the first platform receives the contact list, and obtains the first contact identification bound to the second or the third contact identification, then sends and prompts account information of the first contact account corresponding to the first contact identification to the terminal device.

In this step, according to the third contact identification included in the contact list, the first platform may search the stored relationship between the third and first contact identifications. If the corresponding first identification is found, then the first platform may determine that the found first contract identification is the right first contact identification bound to the third contact identification.

Step 1117, the terminal device receives the account information of the first contact account, and then prompting it.

In this step, the terminal device may receive and prompt and/or display the account information of the first contact account of a plurality of contacts, so as to let the user choose the account information of the first contact account who he wants to add.

Further, the terminal device further may send the access token to the first platform while sending the contact list, and then the first platform may receive and store them.

And then, according to the stored contact list, the first platform may periodically acquire the second contact identification of a new contact who may be created in the recent period, and/or the third contact identification of the second contact account of the new contact, and may send the second contact identification of the new contact and/or the third contact identification of the second contact account of the new contact to the terminal device. The operation may include:

Firstly, the first platform may send the first request for acquiring the contact list to the second platform, and the first request carries the access token. Then, the second platform may receive the access token, and acquire the second user account according to the access token and then acquire the contact list from the second account. Then, the first platform may receive the contact list, compare the stored contact list with the received contact list to determine the second contact identification of the new contact and/or the third contact identification of the second contact account of the new contact. The first platform then may obtain the first contact identification of the first account of the new contact that is bound to the second contact identification of the new contact and/or the third contact identification of the second contact account of the new contact. Accordingly, the first platform may obtain the account information of the first contact account corresponding to the first contact identification, and send the account information to the terminal device.

Further, the first platform may update the stored contact list with the received contact list.

Further, the terminal device may store the contact list received in the step 1115, and then periodically acquire the second contact identification of the new contact and/or the third contact identification of the second contact account of the new contact. The operation may include:

The terminal device may periodically send the first request carrying the access token to the second platform, and the second platform may receive the access token and acquire the second account and the contact list accordingly, and then may sent the contact list to the terminal device. The terminal device may receive the contact list, and compare the stored contact list with the received contact list, so that the second contact identification of the new contact who is recently created and/or the third contact identification of the second contact account of the new contact may be determined by the terminal device. The second and/or third contact identification of the new contact then may be sent to the first platform. Thus the first platform may acquire the first contact identification of the first contact account of the new contact that is bound to the second and/or third contact identification of the new contact, and then acquire the account information of the first contact account corresponding to the first contact identification. The first platform then may send the contact account information to the terminal device.

Further, the terminal device may update the stored contact list with the received contact list.

Step 1118, the terminal device add the first contact identification of the contact to the first contact list of the first user account, according to the account information of the first contact account.

In this example embodiment, the terminal device may send the first request for acquiring the contact list to the second platform, then the second platform may acquire the contact list, which includes a contact of the user in the second user account, a second contact identification corresponding to the contact, and/or a third contact identification of the second contact account. And then such a list may be sent to the terminal device. Subsequently, the contact list may be sent to the first platform. Accordingly, the first contact identification bound to the second or the third contact identification included in the contact list may be acquired. Accordingly, the account information of the first contact account corresponding to the first contact identification may be acquired. And the account information with the first contact identification may be prompted by the terminal device, so that the user can add the contacts in the second platform to the first contact list on the first user account in the first platform, thereby extending the relation chain of the user.

Figure 12:
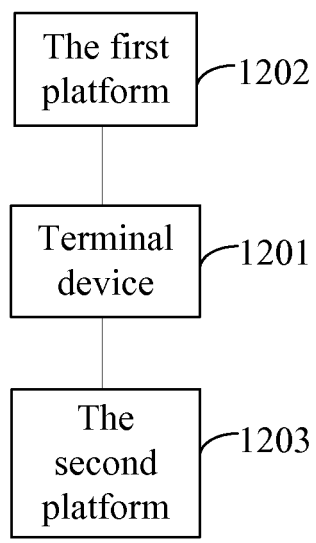
FIG. 12 is a schematic view of a system for account information according to a twelfth example embodiment of the present disclosure.

FIG. 12 is a schematic view of a system for account information according to a twelfth example embodiment of the present disclosure. The system may include a terminal device 1201, a first platform 1202, and a second platform 1203.

The terminal device 1201 may be configured to send the first request for acquiring the contact list to the second platform, receive contact list sent by the second platform which may be included in the second user account in the second platform, who may be in the first platform. The contact list may include the contact of the user in the second user account, the second contact identification corresponding to the contact, and/or the third contact identification of the second contact account. The terminal device 1201 may send the contact list to the first platform, receive account information of the first contact account in the first platform sent by the first platform, and then prompting it, the account information at least including a first contact identification of the first contact account;

The first platform 1202 may be configured to receive the contact list sent by the terminal device, acquire the first contact identification bound to the second or the third contact identification included in the contact list, and then send the account information of the first contact account corresponding to the first contact identification acquired above to the terminal device; and The second platform 1203 may be configured to acquire a contact list included in a second user account of a user in a second platform, who may be in a first platform according to the first request.

Furthermore, the terminal device 1021 may be configured to send the first request to the second platform, and an access token may be carried in the first request.

The second platform 1203 may be configured to acquire the contact list included in the second user account in the second platform, according to the access token.

The first platform 1202 may be configured to search a stored relationship between the third contact identification and the first contact identification according to the third contact identification included in the contact list; if the first contact identification corresponding to the third contact identification is found, then determine the first contact identification being found to be the first contact identification bound to the third contact identification; and/or search a stored relationship between the second contact identification and the first contact identification according to the second contact identification included in the contact list; if the first contact identification corresponding to the second contact identification is found, then confirm the first contact identification being found to be the first contact identification bound to the second contact identification.

Furthermore, the terminal device 1201 may be further configured to acquire the second user identification, and send a binding request to the first platform, the binding request carrying the first user identification of the first user account and the second user identification.

The first platform 1202 may be further configured to bind the first user identification of the first user account to the second user identification.

The terminal device 1201 may be further configured to acquire the third user identification, and send a binding request to the first platform, the binding request carrying the first user identification of the first user account and the third user identification.

The first platform 1202 may be further configured to bind the first user identification of the first user account to the third user identification.

Moreover, the terminal device 1201 may be further configured to send a second request carrying an access token for acquiring the third user identification to the second platform, and receiving a response message carrying the third user identification for acquiring the third user identification sent by the second platform.

The second platform 1203 may be further configured to acquire the third user identification of the second user account according to the access token.

The terminal device 1201 may be further configured to request the second platform to generate an access token according to stored application identification.

The terminal device 1201 may be configured to send a validation request carrying the application identification to the second platform, receive a login page returned by the second platform and then receive a third user identification and a password entered by the user via the login page, send an authorization message carrying the third user identification and the password to the second platform, and receive an access token sent by the second platform.

The second platform 1203 may be further configured to acquire the login page according to the application identification and generate the access token accordingly to the third user identification and the password.

The terminal device 1201 may be further configured to store the contact list, and then periodically acquire the second contact identification of the new contact who may be recently added in the contact list, and/or the third contact identification of the second account of the new contact accordingly.

Further, the terminal device 1201 may be further configured to periodically acquire the contact list of the user, included in the second user account of the second platform, and then determining the second contact identification of a new contact created in this period, and/or the third contact identification of the second account of the new contact, according to the contact list stored and the contact list periodically acquired; send the second contact identification of the new contact and/or the third contact identification of the second contact account to the first platform, and receive the account information of the first contact account which may be corresponding to the first contact identification sent by the first platform.

The first platform 1202 may be further configured to acquire the first contact identification bound to the second contact identification of the new contact and/or the third contact identification of the second contact account of the new contact.

The first platform 1202 may be configured to storing the contact list, and periodically acquiring the second contact identification of a new contact who may be created in this period, and/or the third contact identification of the second contact account of the new contact accordingly, and then sending the second contact identification of the new contact and/or the third contact identification of the second account of the new contact to the terminal device.

In this example embodiment, since the contact list included in a second user account in a second platform may be acquired, and the contact list includes a contact of the user in the second user account, a second contact identification corresponding to the contact, and/or a third contact identification of the second contact account, thus account information of the first contact account in the first contact account in the first platform may be obtained according to the second or the third contact identification of the contact, and the account information may at least include the first identification of the first account, so that the user can add the contacts in the second platform to the first contact list on the first user account in the first platform, thereby extending the relation chain of the user.

It should be understood for persons skilled in the art that the whole or partial steps described in the above example embodiments can be implemented by hardware or by ordering the hardware with program, said program can be stored in a readable storage medium of a computer, such as ROM, disk or CD.

While the invention has been described in connection with what may be presently considered to be the most practical and preferred example embodiments, it may be to be understood that the invention may be not to be limited to the disclosed example embodiments, but on the contrary, may be intended to cover various modifications and equivalent arrangements included within the spirit and scope of the invention.

Thus, example embodiments illustrated in FIGS. 1-14 serve only as examples to illustrate several ways of implementation of the present disclosure. They should not be construed as to limit the spirit and scope of the example embodiments of the present disclosure. It should be noted that those skilled in the art may still make various modifications or variations without departing from the spirit and scope of the example embodiments. Such modifications and variations shall fall within the protection scope of the example embodiments, as defined in attached claims.

The invention claimed is:

1. A terminal device, comprising:
a non-transitory processor-readable storage medium comprising a set of instructions for providing a user of a software platform capable of obtaining contact information of the user from another account of the user; and
a hardware processor in communication with the non-transitory processor-readable storage medium, wherein, when the hardware processor executes the set of instructions, the terminal device:
communicates with a first online platform, wherein:
the first online platform is an online interpersonal communication platform and independent from the terminal device,
the user has a first user account on the first online platform,
a first user identification is associated with the first user account,
the user has a second user account on a second platform,
a second user identification is associated with the second user account,
the second user account includes a contact of the user on the second platform,
the contact has a second contact account on the second platform associated with a second contact identification, and
the contact has a first contact account on the first online platform associated with a first contact identification; and
instructs the first online platform to:
send a validation request to validate from the second platform an authority that the first online platform is authorized to access the second user account on the second platform, the validation request including an application identification,
receive a login interface from the second platform in response to the application identification, and receive the second user identification and a password from the user via the login interface, and
send an authorization message to the second platform, instructing the second platform to generate an access token according to the second user identification and the password of the user;
receives the access token from the second platform;
instructs the first online platform to send a first request to the second platform, wherein the first request includes the access token and is configured to instruct the second platform to access the second user account according to the access token and acquire the contact in the second user account;
obtains the contact in the second user account from the second platform and sends the contact to the first online platform; and
instructs the first online platform to:
obtain the second contact identification corresponding to the contact from the second platform;
acquire account information of the first contact account based on the second contact identification; and
display the account information of the first contact account to the user.

2. The terminal device according to claim 1, wherein, when the terminal device instructs the first online platform to acquire the account information of the first contact account based on the second contact identification, the terminal device instructs the first online platform to:
search a relationship between the second contact identification and the first contact identification stored in the first online platform according to the second contact identification; and
when the first contact identification corresponding to the second contact identification is found, acquire the account information of the first contact account associated with the first contact identification.

3. The terminal device according to claim 1, wherein, when the hardware processor executes the set of instructions, the terminal device further instructs the first online platform to perform at least one of:
receiving a binding request from the user in communicating with the first online platform, wherein the binding request includes the first user identification and the second user identification; or
binding the first user identification to the second user identification.

4. The terminal device according to claim 1, wherein
the first online platform is an online social medium;
the second platform is an E-mail provider;
the first user account is an account associated with the online social medium;
the second user account is an E-mail account provided by the E-mail provider;
the first user identification is one of an E-mail account of the user and a phone number of the user;
the second user identification is one of an E-mail account of the user and a phone number of the user;
the first contact identification is one of an E-mail account of the contact and a phone number of the contact; and
the second contact identification is one of an E-mail account of the contact and a phone number of the contact.

5. The terminal device according to claim 1, wherein, when the hardware processor executes the set of instructions, the terminal device further instructs the first online platform to:
periodically acquire a contact list included in the second user account on the second platform;

determine a new contact being newly added in the contact list and a second contact identification of the new contact;

acquire a first contact identification of the new contact bound to the second contact identification of the new contact and account information of a first contact account of the new contact on the first online platform associated with the first contact identification of the new contact; and provide the account information of the first contact account of the new contact.

6. A method for providing a user of a software online platform capable of obtaining contact information of the user from another account of the user, comprising:

communicating, by a terminal device comprising a memory and a hardware processor in communication with the memory, with a first online platform, wherein
a user has a first user account on the first online platform,
the first online platform is an online interpersonal communication platform and independent from the terminal device,
a first user identification is associated with the first user account,
the user has a second user account on a second platform,
a second user identification is associated with the second user account,
the second user account includes a contact of the user on the second platform,
the contact has a second contact account on the second platform associated with a second contact identification, and
the contact has a first contact account on the first online platform associated with a first contact identification;

instructing, by the terminal device, the first online platform to perform:
sending a validation request to validate from the second platform an authority that the first online platform is authorized to access the second user account on the second platform, the validation request including an application identification,
receiving a login interface from the second platform in response to the application identification, and receiving the second user identification and a password from the user via the login interface, and
sending an authorization message to the second platform, instructing the second platform to generate an access token according to the second user identification and the password of the user;

receiving, by the terminal device, the access token from the second platform;

instructing, by the terminal device, the first online platform to send a first request to the second platform, wherein the first request includes the access token and is configured to instruct the second platform to access the second user account according to the access token and acquire the contact in the second user account;

obtaining, by the terminal device, the contact in the second user account from the second platform and send the contact to the first online platform;

instructing, by the terminal device, the first online platform to perform obtaining the second contact identification corresponding to the contact from the second platform;

acquiring, by the terminal device, account information of the first contact account based on the second contact identification; and displaying, by the terminal device, the account information of the first contact account to the user.

7. The method according to claim 6, wherein the acquiring, by the terminal device, the account information of the first contact account comprises:
searching a relationship between the second contact identification and the first contact identification stored in the first online platform according to the second contact identification; and
when the first contact identification corresponding to the second contact identification is found, acquiring the account information of the first contact account associated with the first contact identification.

8. The method according to claim 6, wherein the instructing the first online platform to perform, further comprising at least one of:
receiving, by the terminal device, a binding request from the user in communicating with the first online platform, wherein the binding request includes the first user identification and the second user identification; or
binding, by the terminal device, the first user identification to the second user identification.

9. The method according to claim 6, wherein the first online platform is an online social medium;
the second platform is an E-mail provider;
the first user account is an account associated with the online social medium;
the second user account is an E-mail account provided by the E-mail provider;
the first user identification is one of an E-mail account of the user and a phone number of the user;
the second user identification is one of an E-mail account of the user and a phone number of the user;
the first contact identification is one of an E-mail account of the contact and a phone number of the contact; and
the second contact identification is one of an E-mail account of the contact and a phone number of the contact.

10. The method according to claim 6, wherein the instructing the first online platform to perform, further comprising:
periodically acquiring, by the terminal device, a contact list included in the second user account on the second platform;
determining, by the terminal device, a new contact being newly added in the contact list and a second contact identification of the new contact;
acquiring, by the terminal device, a first contact identification of the new contact bound to the second contact identification of the new contact and account information of a first contact account on the first online platform associated with the first contact identification of the new contact; and
providing, by the terminal device, the account information of the first contact account of the new contact.

11. A non-transitory, processor-readable storage medium, comprising a set of instructions for obtaining contact information from another account of a user, wherein the set of instructions, when executing by a hardware processor, directs the hardware processor to instruct a first online platform to perform acts of:
providing a user with a first user account on a first online platform, wherein:

the first online platform is an online interpersonal communication platform and independent from the hardware processor, a first user identification is associated with the first user account, the user has a second user account on a second platform, a second user identification is associated with the second user account, the second user account includes a contact of the user on the second platform, the contact has a second contact account on the second platform associated with a second contact identification, and the contact has a first contact account on the first online platform associated with a first contact identification;

sending a validation request to validate from the second platform an authority that the first online platform is authorized to access the second user account on the second platform, the validation request including an application identification, receiving a login interface from the second platform in response to the application identification, and receiving the second user identification and a password from the user via the login interface, and sending an authorization message to the second platform, instructing the second platform to generate an access token according to the second user identification and the password of the user;

receiving the access token from the second platform;

sending a first request to the second platform, wherein the first request includes the access token and is configured to instruct the second platform to access the second user account according to the access token and acquire the contact in the second user account;

obtaining the contact in the second user account from the second platform and send the contact to the first online platform;

obtaining the second contact identification corresponding to the contact from the second platform;

acquiring account information of the first contact account based on the second contact identification; and displaying the account information of the first contact account to the user.

12. The non-transitory, processor-readable storage medium according to claim 11, wherein the acquiring of the account information of the first contact account based on the second contact identification comprises:

searching a relationship between the second contact identification and the first contact identification stored in the first online platform according to the second contact identification; and when the first contact identification corresponding to the second contact identification is found, acquiring the account information of the first contact account associated with the first contact identification.

13. The non-transitory, processor-readable storage medium according to claim 11, wherein the set of instructions further configured to direct the hardware processor to instruct the first online platform to perform at least one of the acts of:

receiving a binding request from the user in communicating with the first online platform, wherein the binding request includes the first user identification and the second user identification; or binding the first user identification to the second user identification.

14. The non-transitory, processor-readable storage medium according to claim 11, wherein the first online platform is an online social medium;

the second platform is an E-mail provider;

the first user account is an account associated with the online social medium;

the second user account is an E-mail account provided by the E-mail provider;

the first user identification is one of an E-mail account of the user and a phone number of the user;

the second user identification is one of an E-mail account of the user and a phone number of the user;

the first contact identification is one of an E-mail account of the contact and a phone number of the contact; and the second contact identification is one of an E-mail account of the contact and a phone number of the contact.

* * * * *